(12) United States Patent
Uno

(10) Patent No.: US 11,354,074 B2
(45) Date of Patent: Jun. 7, 2022

(54) STORAGE MEDIUM STORING INSTRUCTIONS FOR CREATING FIRST PRINT LABEL AND SECOND PRINT LABEL HAVING ALIGNMENT MARK USED WHEN OVERLAYING FIRST AND SECOND PRINT LABELS

(71) Applicant: BROTHER KOGYO KABUSHIKI KAISHA, Nagoya (JP)

(72) Inventor: Masaru Uno, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 17/380,849

(22) Filed: Jul. 20, 2021

(65) Prior Publication Data
US 2022/0027105 A1 Jan. 27, 2022

(30) Foreign Application Priority Data
Jul. 22, 2020 (JP) .............................. JP2020-125677

(51) Int. Cl.
*G06F 3/12* (2006.01)
(52) U.S. Cl.
CPC .......... *G06F 3/1243* (2013.01); *G06F 3/1208* (2013.01); *G06F 3/1285* (2013.01)
(58) Field of Classification Search
CPC ..... G06F 3/1243; G06F 3/1208; G06F 3/1285
USPC ...................................................... 358/1.15
See application file for complete search history.

(56) References Cited

U.S. PATENT DOCUMENTS

| 6,975,425 B1 | 12/2005 | Abe et al. |
| 2012/0218365 A1* | 8/2012 | Unger Iv ............... B41J 3/4075 347/171 |
| 2015/0138225 A1 | 5/2015 | Minato et al. |
| 2018/0040149 A1* | 2/2018 | Bartels .................. G06T 3/4038 |

FOREIGN PATENT DOCUMENTS

| JP | H11-242749 A | 9/1999 |
| JP | 2002-361843 A | 12/2002 |
| JP | 2009-090550 A | 4/2009 |
| JP | 2013-191054 A | 9/2013 |

* cited by examiner

*Primary Examiner* — Neil R McLean
(74) *Attorney, Agent, or Firm* — Kenealy Vaidya LLP

(57) ABSTRACT

A non-transitory computer-readable storage medium stores computer-readable instructions for causing a terminal device to perform: generating first print data for creating a first print label having a first print object formed thereon; generating second print data for creating a second print label having a second print object formed thereon; generating, based on the first print data, outline data representing an outline of the first print object; generating, based on the outline data, alignment mark data representing an alignment mark used for aligning the first print label with the second print label when overlaying these labels; generating third print data by adding the alignment mark data to the second print data such that the alignment mark is added to a portion of the second print label that corresponds to the outline of the first print object; and transmitting the first and third print data to a label creating device.

9 Claims, 19 Drawing Sheets

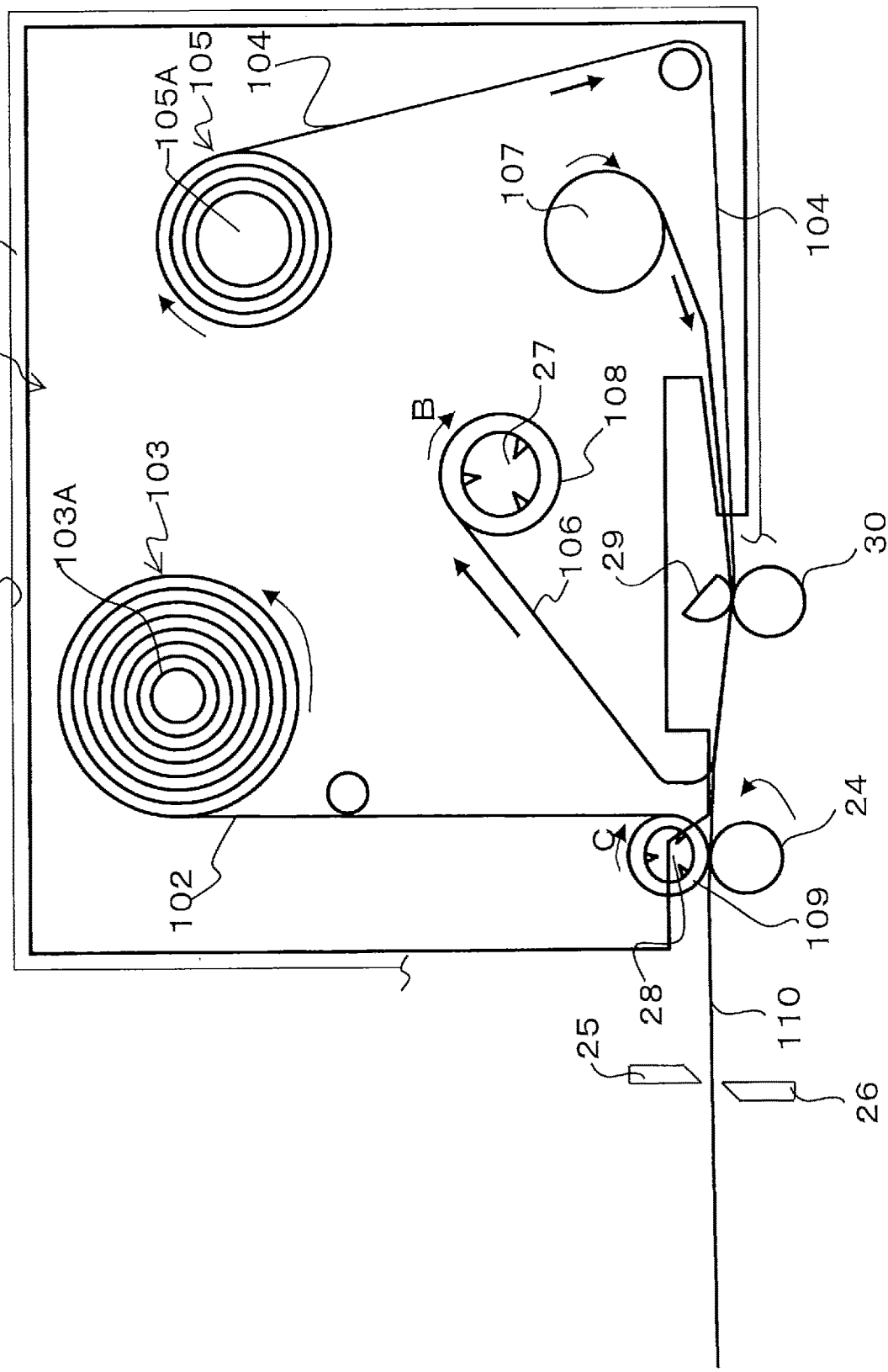

COMPARATIVE EXAMPLE

PRESENT EMBODIMENT

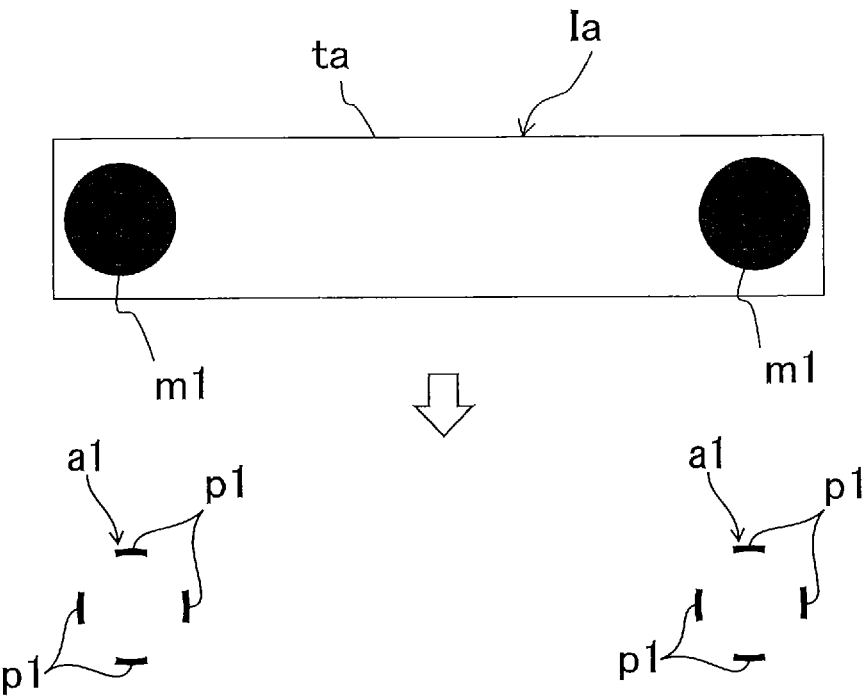
FIG. 10A
FIG. 10B
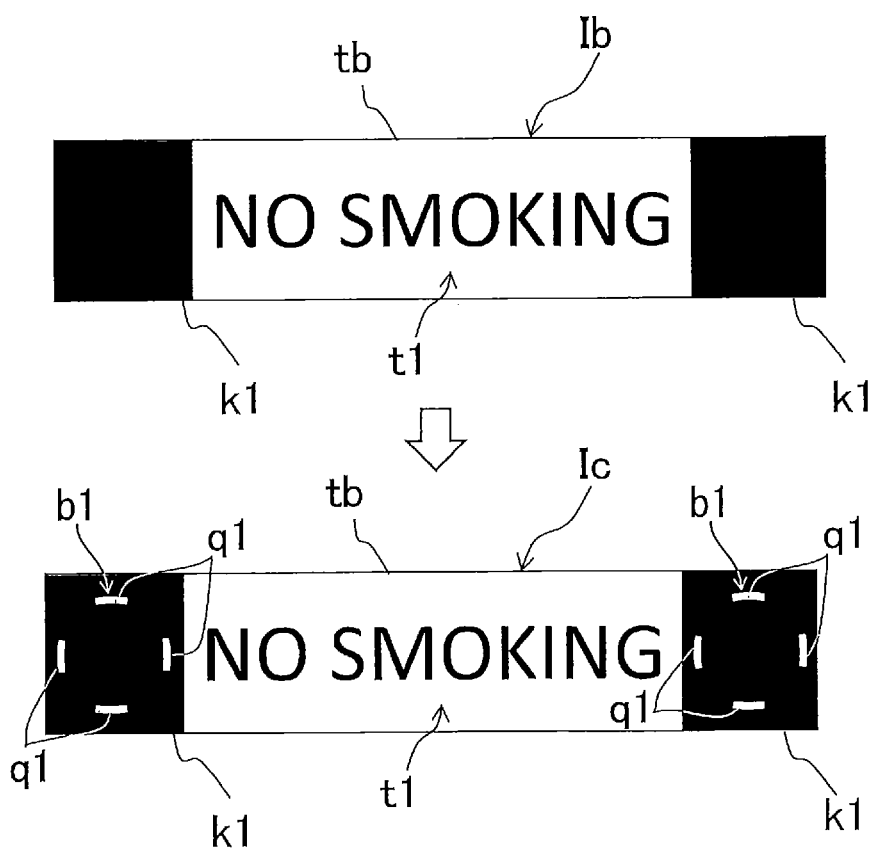
FIG. 10C
FIG. 10D

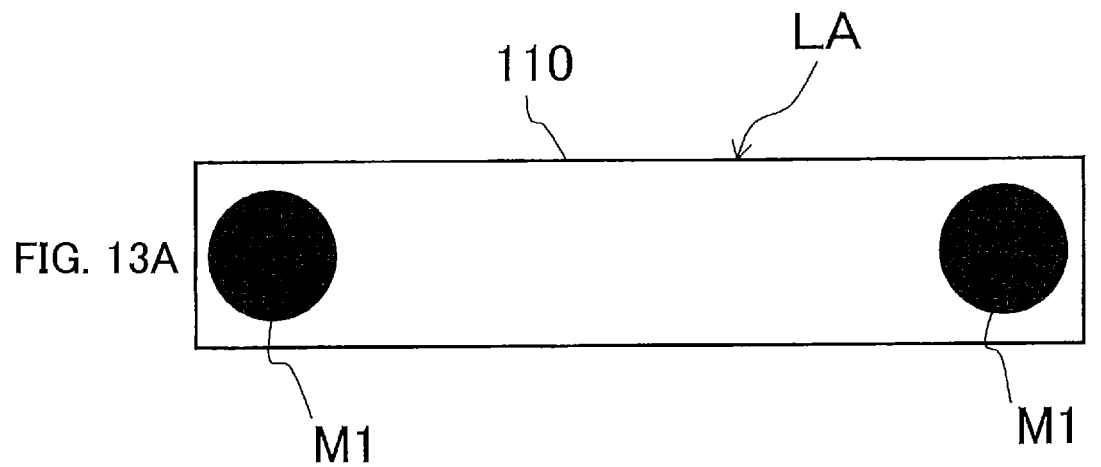
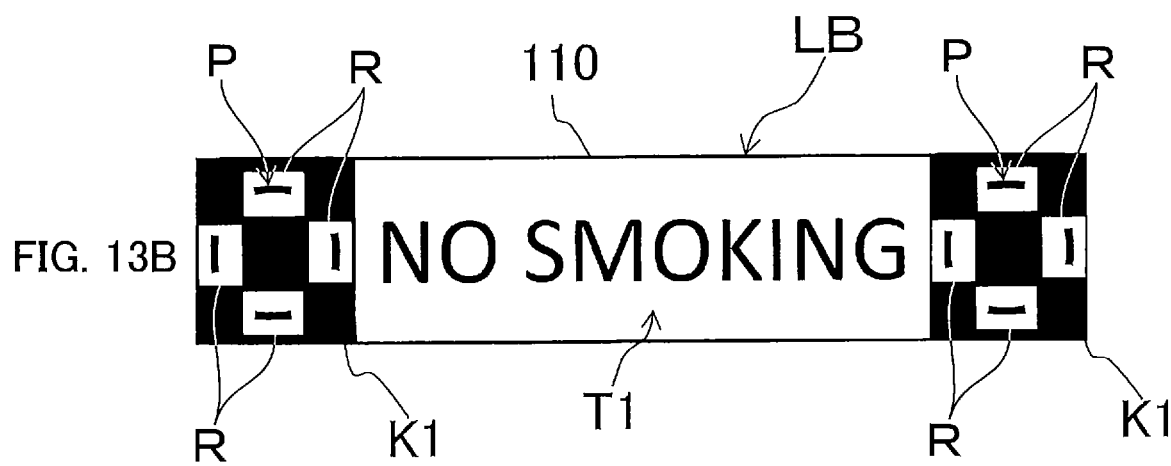
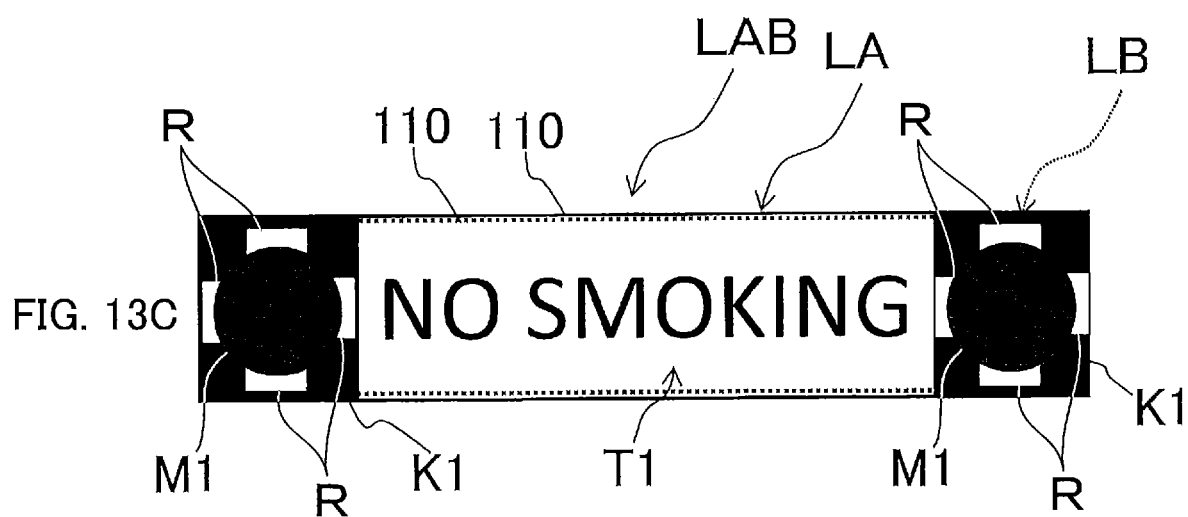

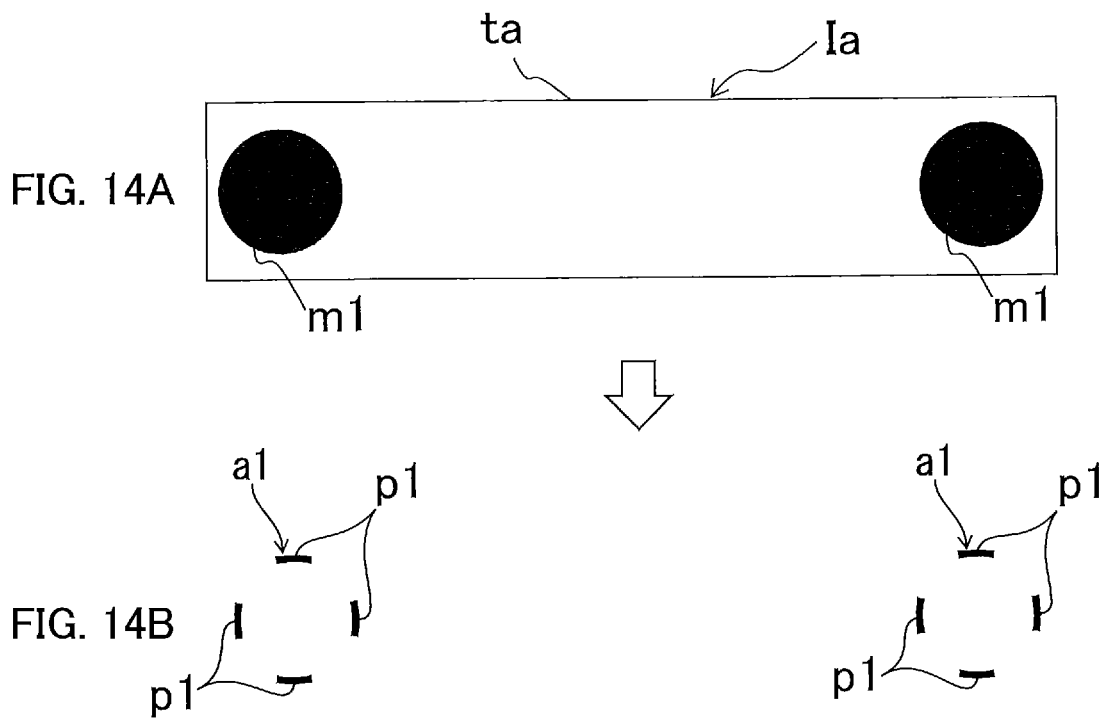
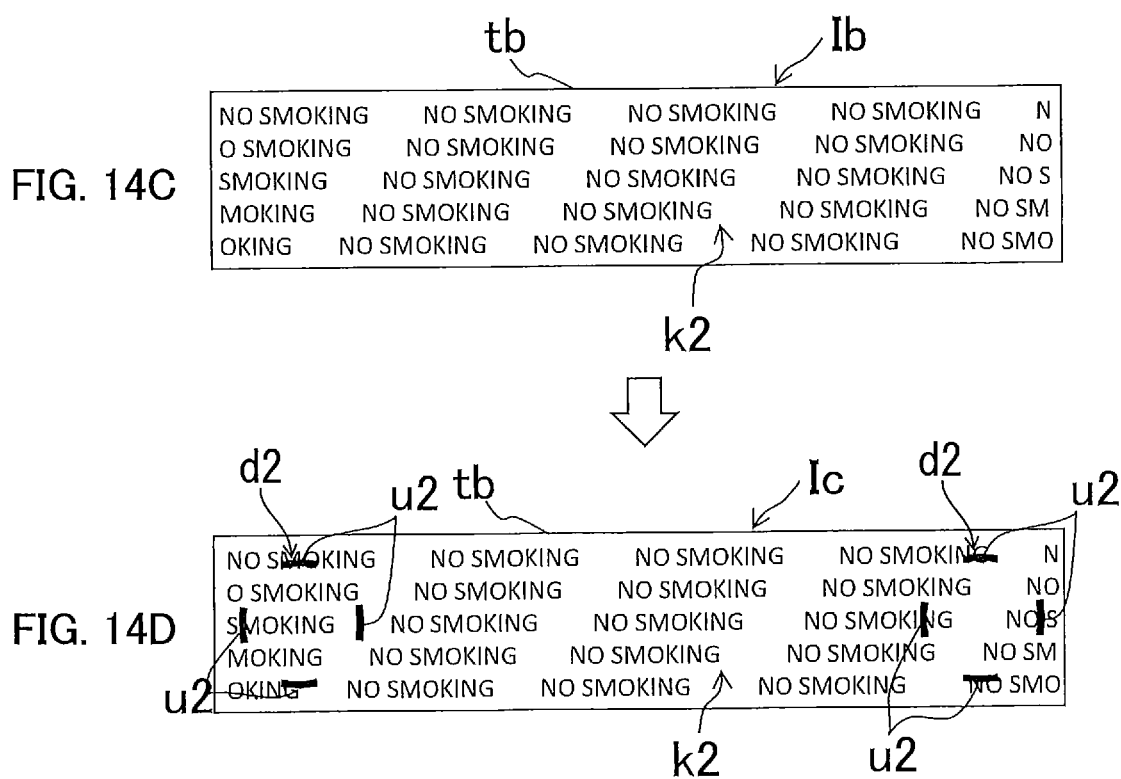

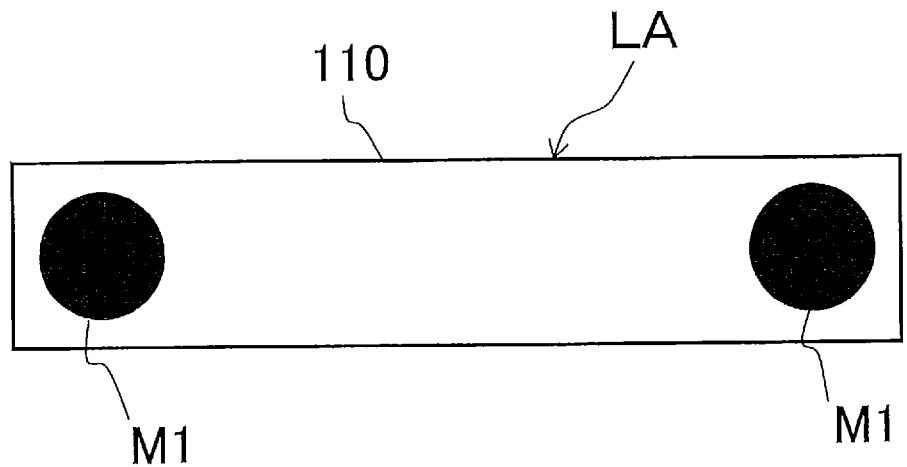
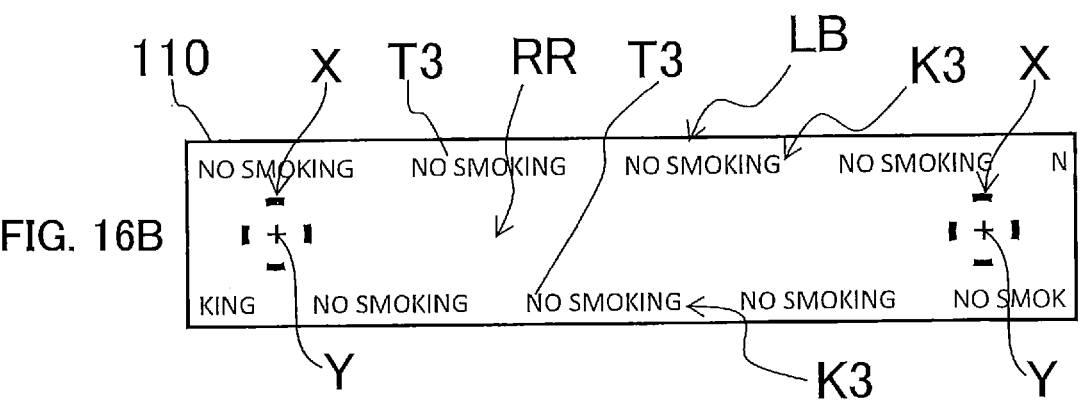
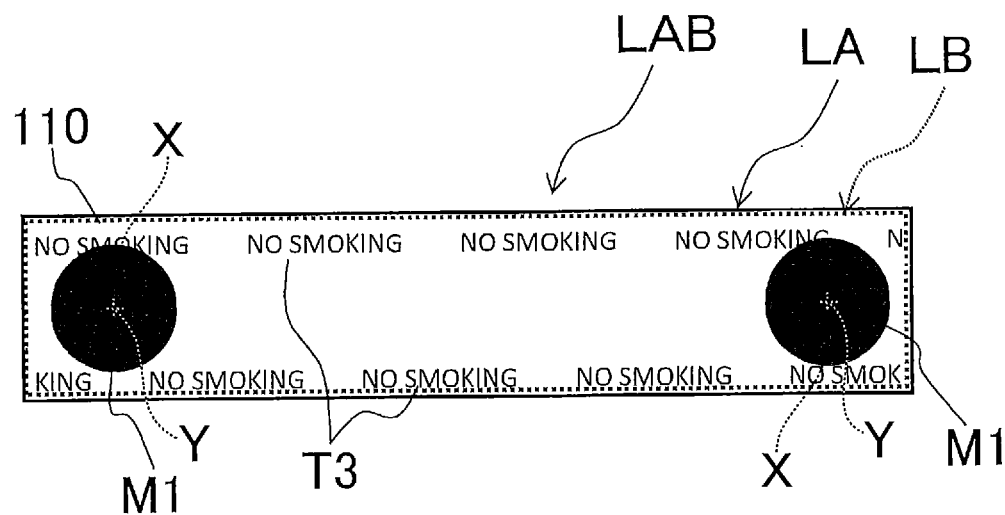

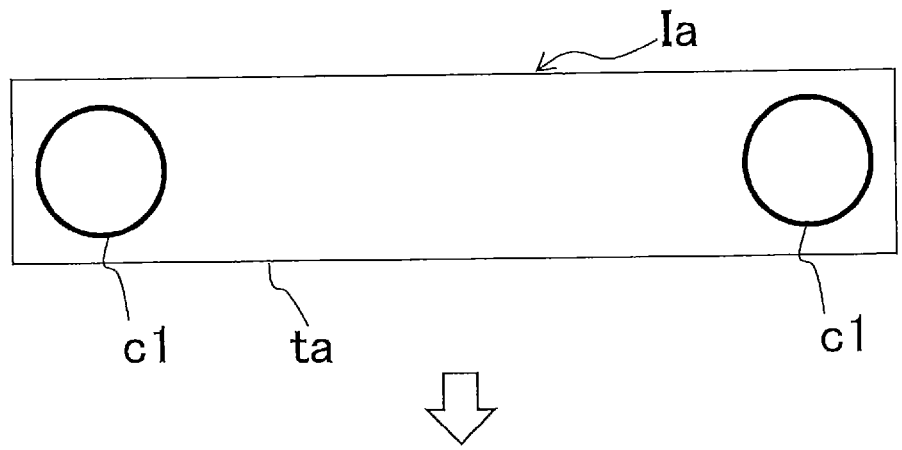
FIG. 18A
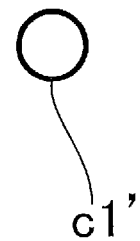
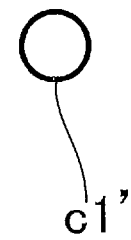
FIG. 18B
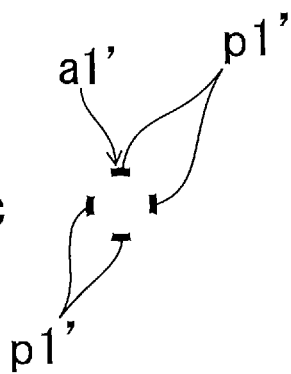
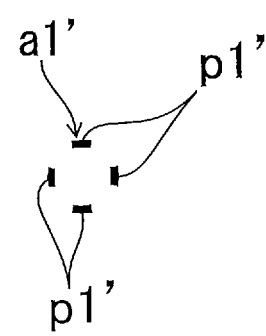
FIG. 18C

STORAGE MEDIUM STORING INSTRUCTIONS FOR CREATING FIRST PRINT LABEL AND SECOND PRINT LABEL HAVING ALIGNMENT MARK USED WHEN OVERLAYING FIRST AND SECOND PRINT LABELS

CROSS REFERENCE TO RELATED APPLICATION

This application claims priority from Japanese Patent Application No. 2020-125677 filed Jul. 22, 2020. The entire content of the priority application is incorporated herein by reference.

TECHNICAL FIELD

The present disclosure relates to a non-transitory computer-readable storage medium storing a set of computer-readable instructions, a control device, and a print label creation method.

BACKGROUND

For example, one technology known in the art enables an operation terminal to create two print labels that are overlaid on each other when the operation terminal is connected to a print label creating device for creating print labels.

SUMMARY

In this conventional technology, a tape printing device creates a first tape and a second tape, and the second tape is overlaid on and bonded to the first tape to produce a composite label. When printing the first tape at this time, the tape printing device prints not only the original image to be printed on the first tape, but also a new additional image extracted from the image to be printed on the second tape. When overlaying the second tape on the first tape, the new additional image on the first tape functions as alignment marks, facilitating the user in aligning the two tapes.

However, the conventional technology does not provide a detailed description on how the alignment marks are derived and created from the image to be printed on the second tape.

In view of the foregoing, it is an object of the present disclosure to provide: a non-transitory computer-readable storage medium storing a set of computer-readable instructions for of automatically creating alignment marks for use when overlaying two print labels; a control device capable of automatically creating alignment marks for use when overlaying two print labels; and a print label creation method for automatically creating alignment marks for use when overlaying two print labels.

In order to attain the above and other objects, according to one aspect, the present disclosure provides a non-transitory computer-readable storage medium storing a set of computer-readable instructions for a terminal device. The terminal device includes a processor and a communication interface enabling the terminal device to communicate with a label creating device configured to create print labels. The set of computer-readable instructions, when executed by the processor, causes the terminal device to perform: (a) generating first print data for creating a first print label on which a first print object is formed, the first print data including first print object data representing the first print object; (b) generating second print data for creating a second print label on which a second print object is formed, the second print data including second print object data representing the second print object; (c) generating, on the basis of the first print object data included in the first print data generated in (a), outline data representing an outline of the first print object; (d) generating, on the basis of the outline data generated in (c), alignment mark data representing an alignment mark, the alignment mark being used for aligning the first print label with the second print label when overlaying the first print label and the second print label on each other; (e) generating third print data by adding the alignment mark data generated in (d) to the second print data generated in (b) such that the alignment mark is added to a specific portion of the second print label, the specific portion being a portion corresponding to the outline of the first print object in the first print label; and (f) transmitting the first print data generated in (a) and the third print data generated in (e) to the label creating device through the communication interface.

According to another aspect, the present disclosure provides a control device including a communication interface and a controller. The communication interface enables the control device to communicate with a label creating device configured to create a print label. The controller is configured to perform: (a) generating first print data for creating a first print label on which a first print object is formed, the first print data including first print object data representing the first print object; (b) generating second print data for creating a second print label on which a second print object is formed, the second print data including second print object data representing the second print object; (c) generating, on the basis of the first print object data included in the first print data generated in (a), outline data representing an outline of the first print object; (d) generating, on the basis of the outline data generated in (c), alignment mark data representing an alignment mark, the alignment mark being used for aligning the first print label with the second print label when overlaying the first print label and the second print label on each other; (e) generating third print data by adding the alignment mark data generated in (d) to the second print data generated in (b) such that the alignment mark is added to a specific portion of the second print label, the specific portion being a portion corresponding to the outline of the first print object in the first print label; and (f) transmitting the first print data generated in (a) and the third print data generated in (e) to the label creating device through the communication interface.

According to still another aspect, the present disclosure provides a print label creation method including: (a) generating first print data for creating a first print label on which a first print object is formed, the first print data including first print object data representing the first print object; (b) generating second print data for creating a second print label on which a second print object is formed, the second print data including second print object data representing the second print object; (c) generating, on the basis of the first print object data included in the first print data generated in (a), outline data representing an outline of the first print object; (d) generating, on the basis of the outline data generated in (c), alignment mark data representing an alignment mark, the alignment mark being used for aligning the first print label with the second print label when overlaying the first print label and the second print label on each other; (e) generating third print data by adding the alignment mark data generated in (d) to the second print data generated in (b) such that the alignment mark is added to a specific portion of the second print label, the specific portion being a portion corresponding to the outline of the first print object in the first print label; and (f) creating the first print label corresponding to the first print data generated in (a) and the second print label corresponding to the third print data generated in (e).

BRIEF DESCRIPTION OF THE DRAWINGS

The particular features and advantages of the embodiment(s) as well as other objects will become apparent from the following description taken in connection with the accompanying drawings, in which:

FIG. 3 is a schematic diagram of the internal structure of a cartridge mountable in the label printer;

FIGS. 10A and 10B are explanatory views illustrating a procedure for extracting alignment mark images from a label image for a top label in a first variation of the embodiment in which alignment marks are formed of blank images;

FIGS. 10C and 10D are explanatory views illustrating an example of adding, to a label image for a bottom label, mark images corresponding to the extracted alignment mark images in the first variation;

FIG. 13A is a plan view of the appearance of the top label in the second variation;

FIG. 13B is a plan view of the appearance of the bottom label in the second variation;

FIG. 13C is a plan view of the appearance of a composite label created by overlaying and bonding the top and bottom labels to each other in the second variation;

FIGS. 14A and 14B are explanatory views illustrating a procedure for extracting alignment mark images from a label image for a top label in a third variation of the embodiment in which alignment marks are formed in a lighter color;

FIGS. 14C and 14D are explanatory views illustrating an example of adding, to a label image for a bottom label, mark images corresponding to the extracted alignment mark images in the third variation;

FIG. 16A is a plan view of the appearance of a top label in a fourth variation of the embodiment in which the overall outer dimension of alignment marks is reduced;

FIG. 16B is a plan view of the appearance of a bottom label in the fourth variation;

FIG. 16C is a plan view of the appearance of a composite label created by overlaying and bonding the top and bottom labels to each other in the fourth variation;

FIGS. 18A to 18C are explanatory views illustrating an example of the procedure for reducing the overall outer dimensions of alignment mark images in a modification of the fourth variation, wherein an outline image included in the label image for the top label is reduced in size and then the alignment mark images are extracted from the reduced outline image.

DETAILED DESCRIPTION

Next, one embodiment of the present disclosure will be described while referring to the accompanying drawings.

<Overall Structure of a Printing System>

Figure 1:
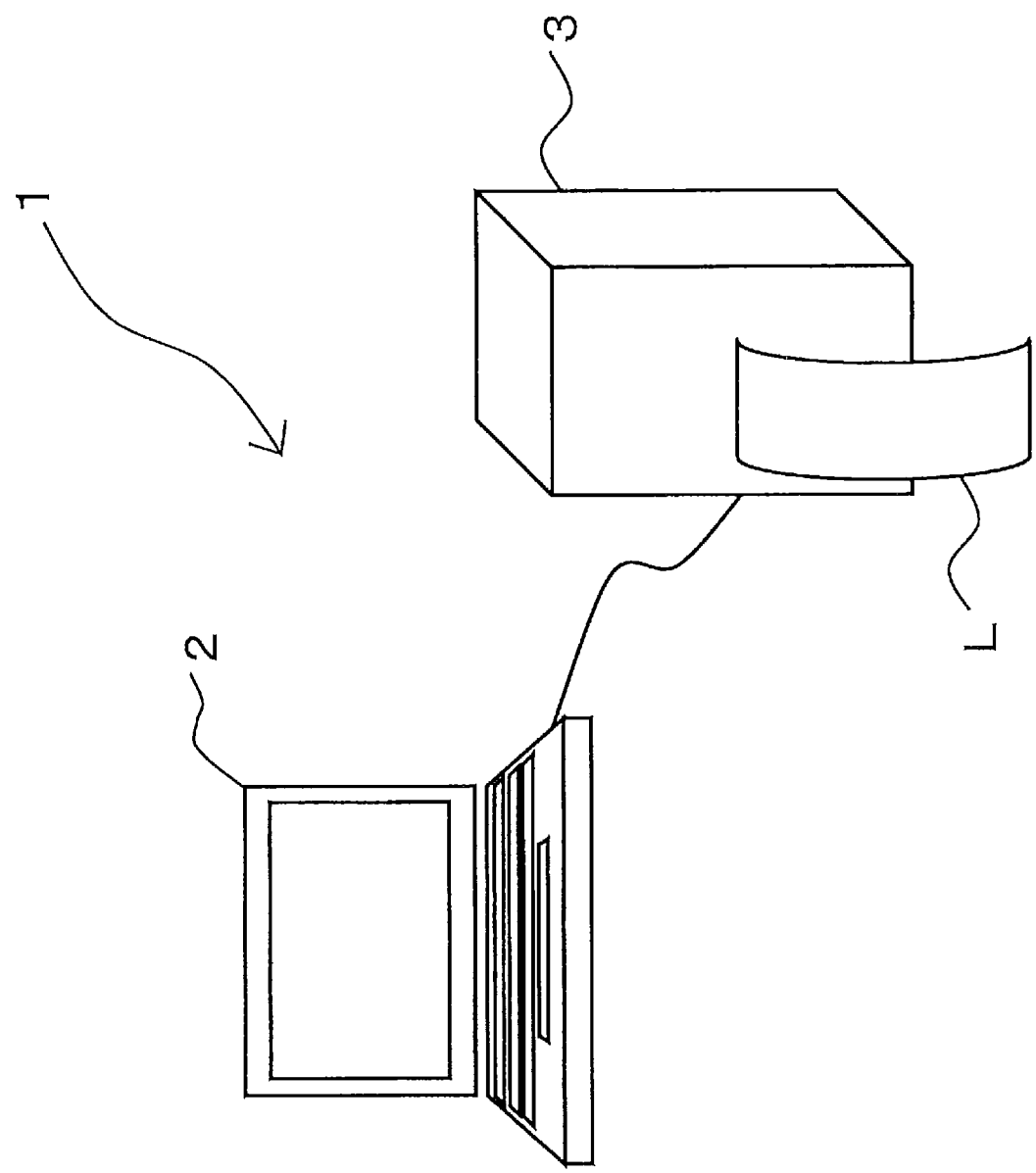
FIG. 1 is a schematic view illustrating the overall structure of a printing system according to one embodiment of the present disclosure.

FIG. 1 shows the overall structure of a printing system 1 according to the present embodiment. In the example of FIG. 1, the printing system 1 includes an operation terminal 2 and a label printer 3 connected to the operation terminal 2. For example, the operation terminal 2 is configured of a general-purpose personal computer. The label printer 3 can exchange information with the operation terminal 2. The label printer 3 is configured to create print labels L in response to user operations performed on the operation terminal 2. The operation terminal 2 is an example of the "terminal device" and is also an example of the "control device." The label printer 3 is an example of the "label creating device."

<Operation Terminal>

Figure 2:
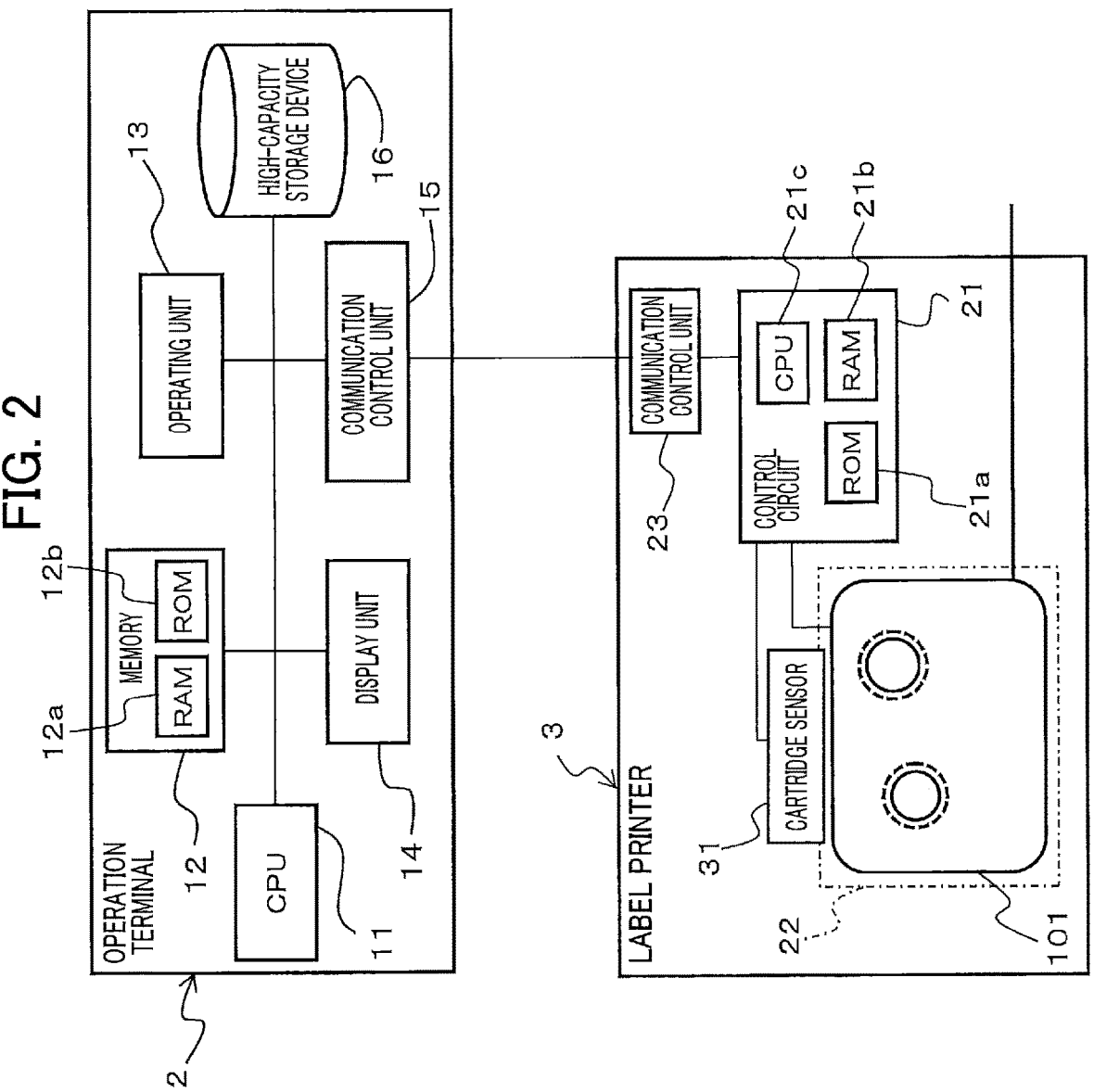
FIG. 2 is a functional block diagram illustrating functional configurations of an operation terminal and a label printer that are included in the printing system.

As shown in FIG. 2, the operation terminal 2 includes a CPU 11, a memory 12, an operating unit 13, a display unit 14, a communication control unit 15, and a high-capacity storage device 16. The memory 12 includes a RAM 12a, a ROM 12b, and the like, for example. The CPU 11 is an example of the "processor." The communication control unit 15 is an example of the "communication interface." The ROM 12b is an example of the "non-transitory computer-readable storage medium."

The user inputs instructions and information on the operating unit 13. The display unit 14 displays various information and messages. Note that, in a case where a smartphone, a mobile terminal, or the like is employed as the operation terminal 2, the operating unit 13 and display unit 14 may be configured as a touchscreen that possesses functions of both the operating unit 13 and display unit 14. The communication control unit 15 controls the exchange of signals (information) with the label printer 3.

The high-capacity storage device 16 stores various programs and information. The ROM 12b of the memory 12 stores a print label creation process program for the CPU 11 to execute the steps in the flowchart of FIG. 9 described later. As an alternative, the print label creation process program may be stored in the high-capacity storage device 16. Note that the high-capacity storage device 16 is not limited to a built-in memory, but may be a suitable external memory such as an SD Card. The print label creation process program is an example of the "set of computer-readable instructions"

The CPU 11 uses the temporary storage function of the RAM 12a to perform the various processes and to exchange various signals (various information) with the label printer 3 according to programs pre-stored in the ROM 12b and the high-capacity storage device 16.

<Label Printer>

As shown in FIG. 2, the label printer 3 includes: a control circuit 21; a cartridge holder 22 in which a cartridge 101 is detachably mountable; a cartridge sensor 31 provided in the cartridge holder 22, and a communication control unit 23.

The cartridge sensor 31 is configured to detect the type of the cartridge 101 mounted in the label printer 3 (the cartridge holder 22) according to a suitable method known in the art, such as mechanical detection or optical or magnetic detection. The types of cartridges 101 are pre-correlated with the types (i.e., the attributes) of a cover film 104, ink ribbon 106, base tape 102, and the like. Through the detection of the type of the cartridge 101 by the cartridge sensor 31, the attributes of the cover film 104, ink ribbon 106, base tape 102, and the like are detected.

The control circuit 21 includes a ROM 21a, a RAM 21b, and CPU 21c. The label printer 3 can exchange information with the operation terminal 2 when the control circuit 21 is connected to the communication control unit 15 of the operation terminal 2 via the communication control unit 23.

<Cartridge and Cartridge Holder>

FIG. 3 shows a detailed structure of the cartridge 101 and the related structure of the cartridge holder 22. The cartridge 101 has a housing 101A, a first roll 103, a second roll 105, a ribbon supply roll 107, a ribbon take-up roller 108, and a tape feed roller 109.

The first roll 103 is a roll formed by winding a base tape 102 around a reel member 103A and is disposed in the housing 101A. The base tape 102 is configured of a bonding adhesive layer, a base layer, a mounting adhesive layer, and a release layer, for example. These layers are laminated sequentially from the inward-facing side of the wound base tape 102 forming the first roll 103 toward the opposite side.

The second roll 105 is a roll formed by winding a transparent cover film 104 about a reel member 105A. The transparent cover film 104 has the same width as the base tape 102. Note that, while depicted as concentric circles in the drawings for simplification, the first roll 103 and second roll 105 are actually wound in a spiral shape.

The cover film 104, base tape 102, and the like are indirectly mounted in the cartridge holder 22 (the label printer 3) by mounting the cartridge 101 in the cartridge holder 22, as described above.

The ribbon supply roll 107 pays out an ink ribbon 106. The ribbon take-up roller 108 takes up the ink ribbon 106 that has been used for printing. Note that the ink ribbon 106 is unnecessary in a case where the cover film 104 is a thermal tape that can produce a prescribed color when heated.

The tape feed roller 109 is rotatably supported near a tape discharge portion of the cartridge 101. The tape feed roller 109 bonds the base tape 102 to the cover film 104 with pressure to form a print label tape 110 while conveying the same.

A ribbon take-up roller drive shaft 27 and a tape feed roller drive shaft 28 are provided in the cartridge holder 22. The ribbon take-up roller drive shaft 27 is provided for taking up the portion of the ink ribbon 106 already used for printing. The tape feed roller drive shaft 28 is provided for conveying the print label tape 110 described above. When the drive force of a conveying roller motor (not shown) is transmitted to the ribbon take-up roller drive shaft 27 and tape feed roller drive shaft 28, the ribbon take-up roller 108 and tape feed roller 109 are driven to rotate in conjunction with each other.

The cartridge holder 22 is also provided with a print head 29 that prints desired content on the cover film 104 as the cover film 104 is conveyed.

A fixed blade 25 and a movable blade 26 are provided along the conveying path of the print label tape 110 on the downstream side of the tape feed roller 109 and a pressure roller 24. The movable blade 26 is configured to cut through the print label tape 110 in the thickness direction in cooperation with the fixed blade 25.

<Outline of Label Printer Operations>

In the label printer 3 having the above construction, when the cartridge 101 is mounted in the cartridge holder 22, the cover film 104 and ink ribbon 106 become interposed between the print head 29 and a platen roller 30 opposing the print head 29. At the same time, the base tape 102 and cover film 104 become interposed between the tape feed roller 109 and the pressure roller 24 opposing the tape feed roller 109.

When the ribbon take-up roller 108 and tape feed roller 109 are driven to rotate in synchronization along the directions indicated by the respective arrows B and C in FIG. 3, the pressure roller 24 and platen roller 30 rotate, whereupon the base tape 102 is paid out from the first roll 103 and supplied to the tape feed roller 109 and the cover film 104 is paid out from the second roll 105. The print head 29 prints on the cover film 104 by a plurality of heating elements in the print head 29 being energized by a print driving circuit (not shown). The ribbon take-up roller drive shaft 27 drives the ribbon take-up roller 108 to take up the ink ribbon 106 that has been used for printing on the cover film 104.

The base tape 102 and the printed portion of the cover film 104 are integrally bonded between the tape feed roller 109 and the pressure roller 24 to form the print label tape 110, and the print label tape 110 is conveyed out of the cartridge 101. The portion of the print label tape 110 that has been conveyed out of the cartridge 101 is cut off through the cooperative operations of the fixed blade 25 and movable blade 26, producing a print label L.

<Composite Labels>

In the present embodiment, two print labels L created by the label printer 3 are overlaid and bonded to each other. The bonded labels are then fixed in that state to a desired object. An example of such print labels will be described next with reference to FIGS. 4A-4C.

Figure 4A:
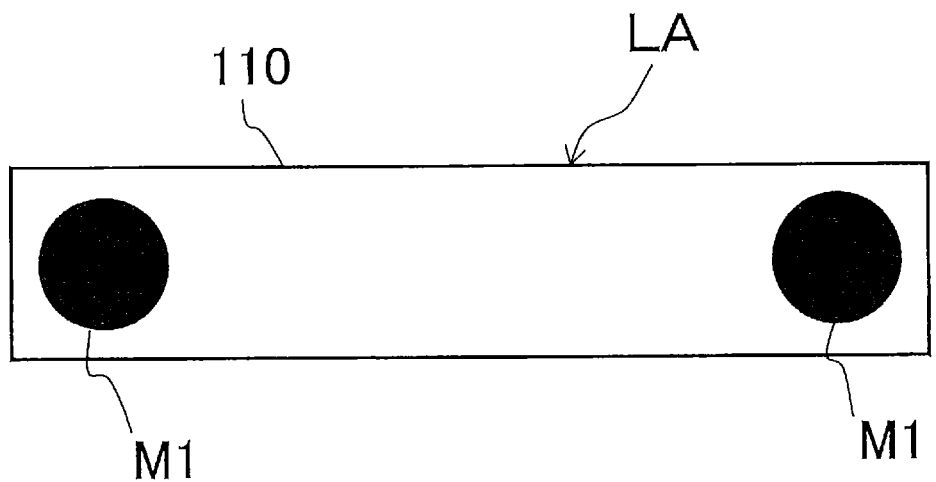
FIGS. 4A to 4C are explanatory views illustrating an example of creation of one print label by overlying two print labels.
Figure 4B:
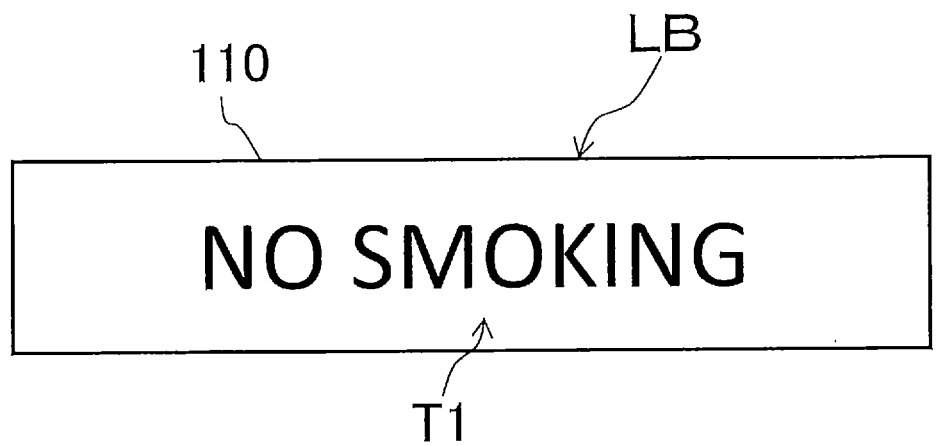

FIG. 4A shows an example of a print label LA constituting one of the two print labels to be overlaid as described above. In this example, a black circular mark M1 is formed on each longitudinal end of the print label LA. FIG. 4B shows an example of a print label LB constituting the other of the two print labels to be overlaid. In this example, a "NO SMOKING" text T1 is formed in the center region of the print label LB. The print label LA is an example of the "first print label." The print label LB is an example of the "second print label." The circular mark M1 is an example of the "first print object." The text T1 is an example of the "second print object."

Figure 4C:
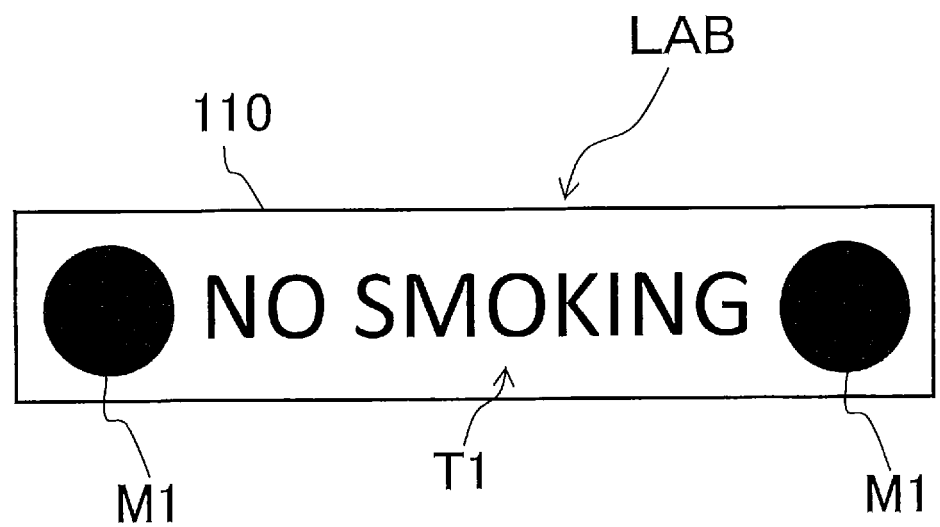

The print label tape 110 constituting the print label LA in FIG. 4A is transparent in this example. Therefore, a print label LAB shown in FIG. 4C is produced by overlaying this print label LA on the print label LB in FIG. 4B and bonding them together. Hereinafter, the print label LAB will be referred to as the "composite label LAB." Further, the print label LA will be called the "top label LA" and the print label LB will be called the "bottom label LB."

As a result of overlaying and bonding the top label LA to the bottom label LB as described above, the circular marks M1 are arranged on both longitudinal ends of the composite label LAB, and the text T1 is arranged between the two circular marks M1. For convenience in the following description, the circular marks M1 and the text T1 will be sometimes called "print objects."

Note that the top label LA and bottom label LB in this example both have the same width and the same length. Thus, the composite label LAB can be created by precisely aligning the top label LA shown in FIG. 4A with the bottom label LB shown in FIG. 4B and overlaying and bonding the top label LA to the top surface of the bottom label LB.

Feature of the Present Embodiment

One feature of the present embodiment having the above configuration is the process for generating marks to serve as alignment marks for aligning the print labels L with each other when overlaying and bonding the print labels L each other. This process will be described below in detail.

COMPARATIVE EXAMPLE

First, a sample procedure for creating the composite label LAB by overlaying and bonding the top label LA and bottom label LB created according to the normal method will be described with reference to FIGS. 5A-5C as a comparative example to the present embodiment.

Figure 5A:
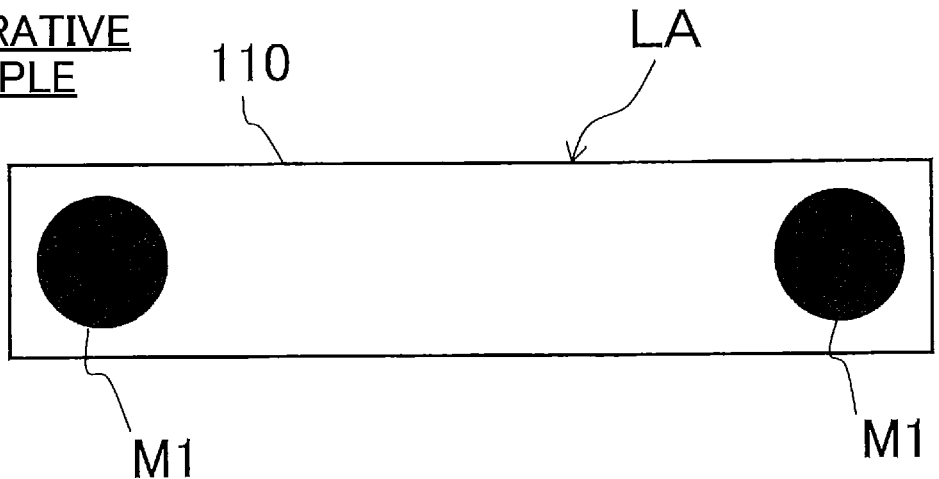
FIG. 5A is a plan view of the appearance of a top label in a comparative example to the embodiment.
Figure 5B:
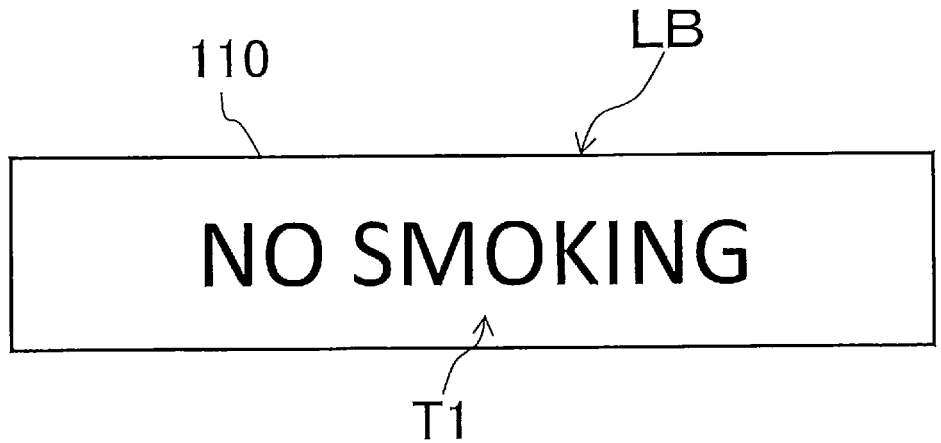
FIG. 5B is a plan view of the appearance of a bottom label in the comparative example to the embodiment.
Figure 5C:
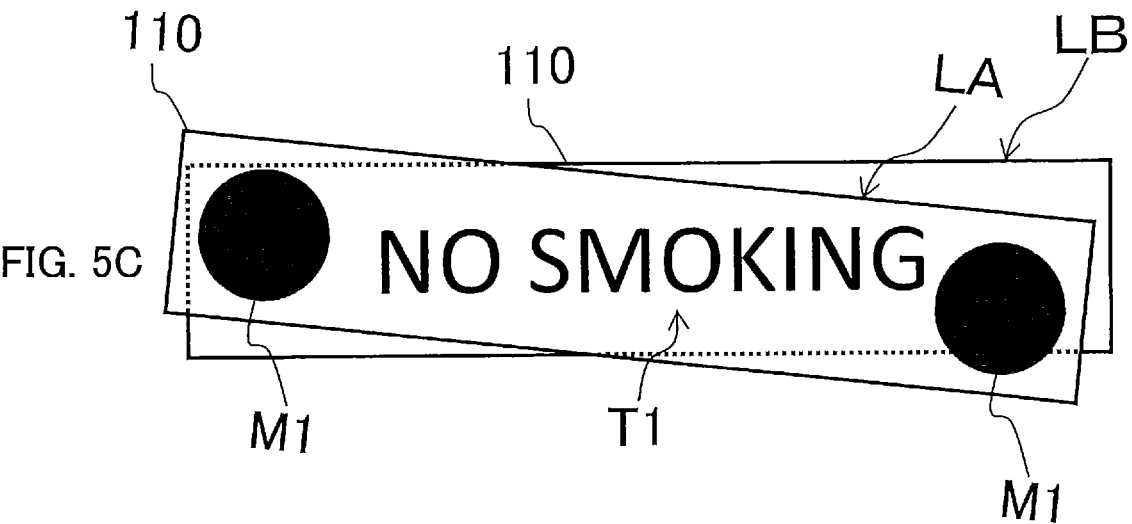
FIG. 5C is a plan view of the appearance of a composite label obtained by overlaying and bonding the top and bottom labels to each other in the comparative example to the embodiment.

The circular marks M1 described above are formed on the top label LA, as illustrated in FIG. 5A. Further, the text T1 described above is formed on the bottom label LB, as shown in FIG. 5B. When the top label LA and bottom label LB are overlaid and bonded together, the composite label LAB described above can be created as the user intends if the top label LA can be bonded to the top of the bottom label LB in its correct position, and specifically if the top label LA can be precisely aligned with the bottom label LB in this example.

However, when overlaying and bonding the top label LA to the bottom label LB in this example, the user cannot verify what portions in the bottom label LB the circular marks M1 on the top label LA should be overlapped with. Consequently, the top label LA may become bonded to the bottom label LB in a position deviating from the intended overlaying position. As a result, the user cannot obtain the desired composite label LAB described above and, in some cases, may be faced with the inconvenience of having to repeat the bonding process.

Bonding of Labels in the Present Embodiment

In order to resolve the alignment problem described above, alignment marks that indicate the portions of the bottom label LB with which the circular marks M1 on the top label LA should be overlapped are generated and printed on the bottom label LB in the present embodiment. This process will be described next with reference to FIGS. 6A-6C.

Figure 6A:
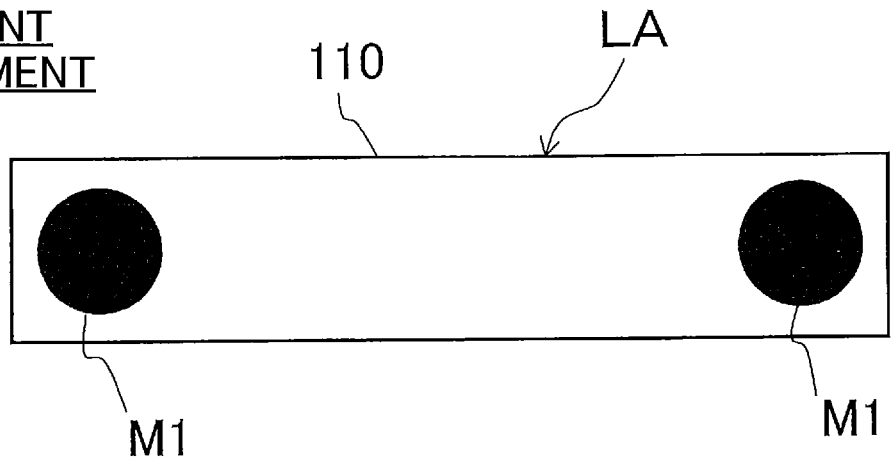
FIG. 6A is a plan view of the appearance of a top label in the embodiment.
Figure 6B:
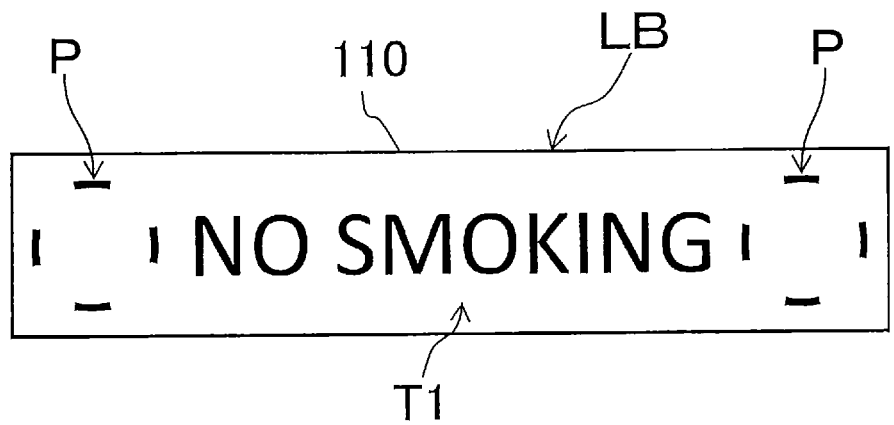
FIG. 6B is a plan view of the appearance of a bottom label in the embodiment.

FIG. 6A is identical to FIG. 5A described above. Hence, the circular marks M1 described above are formed on the top label LA. However, in the present embodiment, alignment marks P are formed on the bottom label LB in addition to the text T1 described above. As shown in FIG. 6B, the alignment marks P are formed based on outlines extracted from the circular marks M1.

Figure 6C:
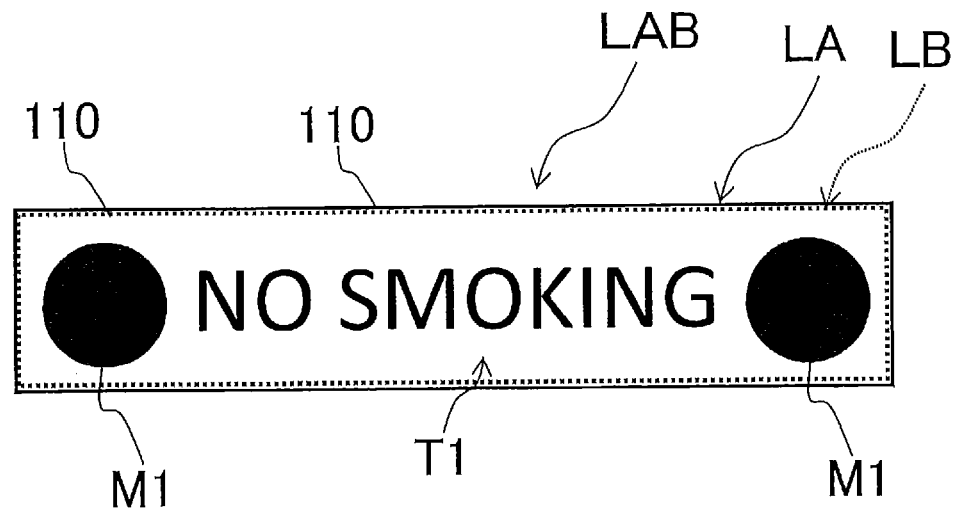
FIG. 6C is a plan view of the appearance of a composite label created by overlaying and bonding the top and bottom labels to each other in the embodiment.

The user can overlay and bond the top label LA to the bottom label LB while aligning the outer edges of the circular marks M1 on the top label LA with the alignment marks P formed on the bottom label LB. Accordingly, the top label LA and bottom label LB can be overlaid and bonded in the correct position, as shown in FIG. 6C. Hence, bonding of the two labels described above is much easier for the user than in the comparative example and thus the number of mistakes occurring during bonding can be reduced.

<Generation of Alignment Marks>

A particular feature of the present embodiment is the method of generating the alignment marks P described above. This method will be described in detail with reference to FIGS. 7A-8B. As described above, in the present embodiment, outlines of the circular marks M1 are extracted, and the alignment marks P are generated based on these outlines.

<Data Processing for the Top Label>

Figure 7A:
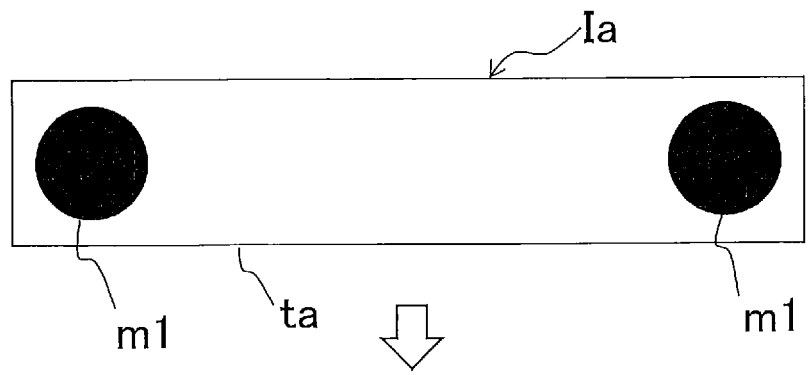
FIGS. 7A to 7E are explanatory views illustrating a procedure for extracting alignment mark images from a label image for the top label in the embodiment.

First, the user suitably edits content to be printed on the top label LA on the operation terminal 2, whereby a label image Ia corresponding to the top label LA (i.e., label image data for creating the top label LA) is generated, as illustrated in FIG. 7A. The label image Ia shown in FIG. 7A corresponds to the top label LA shown in FIG. 6A. Thus, the label image Ia includes a tape image ta (i.e., tape image data) and mark images m1 (i.e., mark image data). The tape image ta represents the appearance of the print label tape 110 forming the top label LA. The mark images m1 correspond to the circular marks M1 and arranged within the tape image ta. The label image Ia is an example of the "first print data." The mark image m1 is an example of the "first print object data."

Figure 7B:
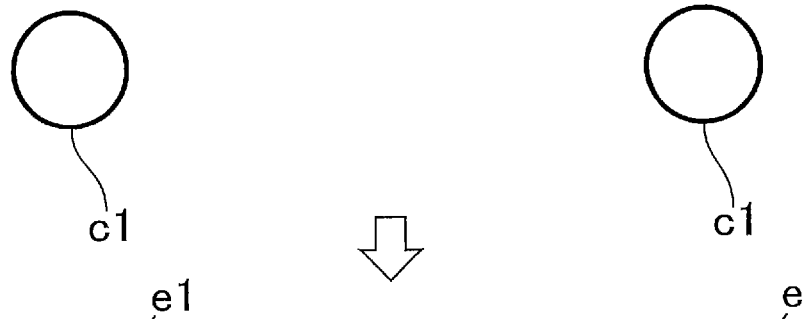

Thereafter, as shown in FIG. 7B, annular outline images c1 (i.e., outline image data) are extracted from the mark images m1 in the tape image ta of the label image Ia shown in FIG. 7A. As shown in FIG. 7B, the outline images c1 represents the outer edge lines of the filled circular shapes forming the mark images m1. In other words, the outline image c1 represents the outline of the circular marks M1. The outline image c1 is an example of the "outline data."

Figure 7C:
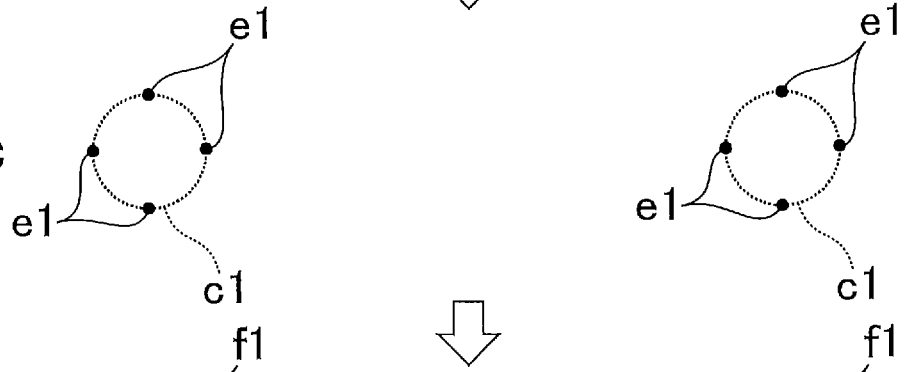

Next, the top edge, bottom edge, left edge, and right edge of each outline image c1 are extracted as edge points e1, as shown in FIG. 7C. That is, the topmost portion of the upper arc segment constituting the annular outline image c1 in this example is extracted as the top edge, and the bottommost portion of the lower arc segment is extracted as the bottom edge. Similarly, the leftmost portion of the left arc segment constituting the annular outline image c1 is extracted as the left edge, and the rightmost portion of the right arc segment is extracted as the right edge. For convenience of comparison, the positions of the original outline images c1 are indicated in FIG. 7C by dashed lines.

Figure 7D:
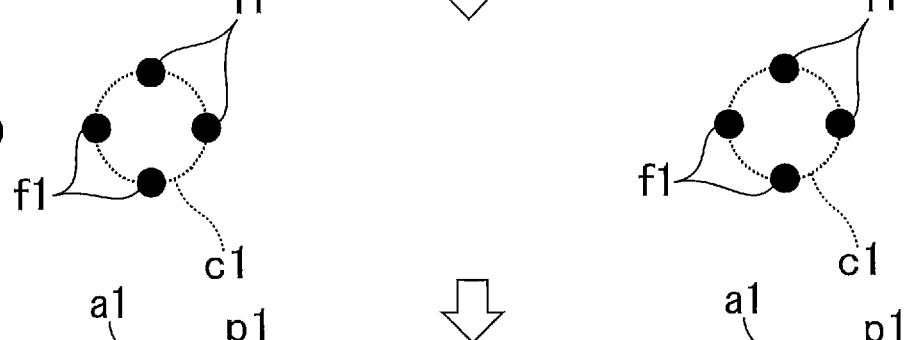

Subsequently, the four edge points e1 corresponding to each outline image c1 are expanded to a suitable size to form four expanded edge points f1 at the same top, bottom, left, and right locations, as illustrated in FIG. 7D. In this example, each expanded edge point f1 is a large black spot since each edge point e1 in FIG. 7C is a small black spot.

Figure 7E:
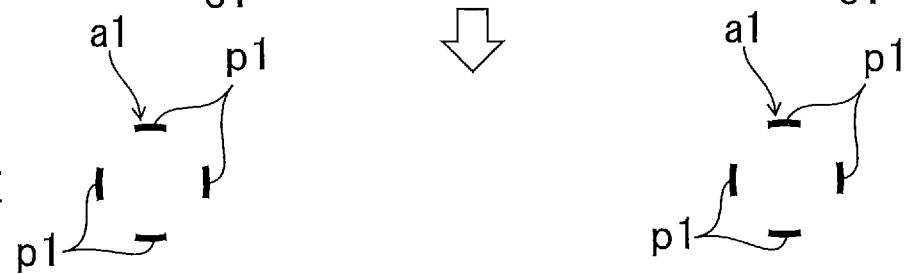

Finally, for each outline image c1, the common portions between the outline image c1 described above and the corresponding four expanded edge points f1 described with FIG. 7D are extracted as part images p1 constituting an alignment mark image a1, as illustrated in FIG. 7E. In other words, for each outline image c1, the intersecting parts of the outline image c1 and the corresponding four expanded edge points f1 are extracted as part images p1 constituting an alignment mark image a1. As a result, for each outline image c1, the alignment mark image a1 constituted by the four extracted part images p1 for the top, bottom, left, and right positions on the outline image c1 is extracted from the outline image c1. Each of the four extracted part images p1 is a very small arc-shaped line. Thus, the four part images p1 as a whole represent a dashed outline of the circular mark M1 (i.e., the outline of the circular mark M1 described by a dashed line). As a result, the alignment mark image a1 represents the dashed outline of the circular mark M1.

<Data Processing for the Bottom Label>

Figure 8A:
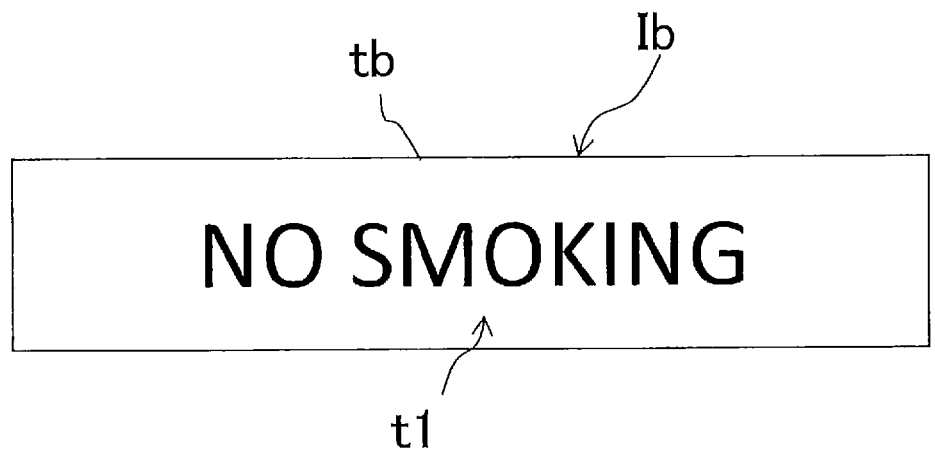
FIG. 8A is an explanatory view illustrating a label image for the bottom label in the embodiment.

In the meantime, as shown in FIG. 8A, the user generates a label image Ib corresponding to the bottom label LB (i.e., label image data for creating the bottom label LB) by suitably editing, on the operation terminal 2, content to be printed on the bottom label LB. In this example, the label image Ib includes a tape image tb (i.e., tape image data) and a text image t1 (i.e., text image data). The tape image tb represents the appearance of the print label tape 110 constituting the bottom label LB. The text image t1 corresponds to the text T1 described above and are arranged inside the tape image tb. The label image Ib is an example of the "second print data." The text image t1 is an example of the "second print object data."

Figure 8B:
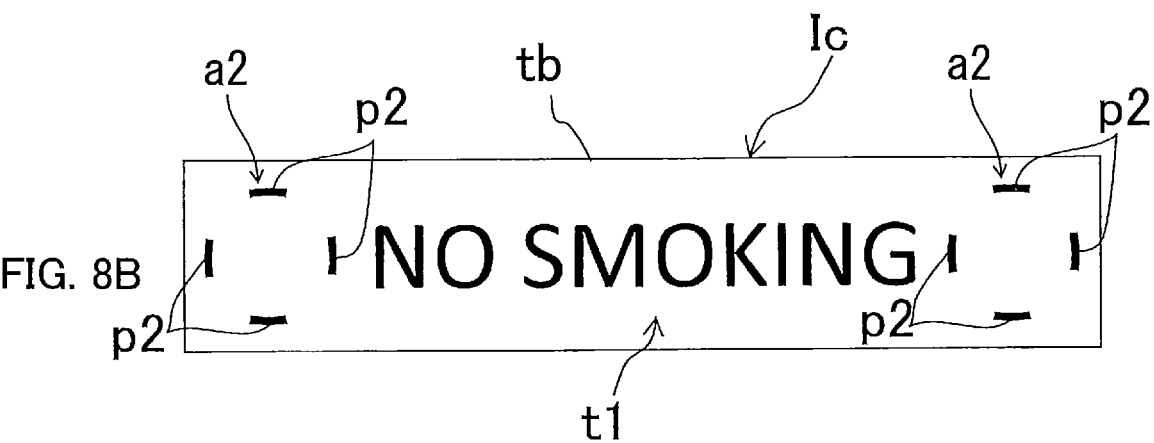
FIG. 8B is an explanatory view illustrating an example of adding, to the label image for the bottom label, mark images corresponding to the extracted alignment mark images in the embodiment.

Next, mark images a2 (i.e., mark image data) corresponding to the alignment mark images a1 and representing the alignment marks P are generated. Each of the mark images a2 is constituted by four part images p2 corresponding to the four extracted part images p1, and hence, each of the alignment marks P represented by the mark images a2 is the dashed outline of the corresponding circular mark M1. Then, a label image Ic (i.e., label image data for creating the bottom label LB) shown in FIG. 8B is generated by adding the mark images a2 to the label image Ib shown in FIG. 8A. The mark images a2 are added to locations in the label image Ib that correspond to the outline images c1 in the label image Ia described above. The label image Ic is an example of the "third print data." The mark image a2 is an example of the "alignment mark data."

Thereafter, the operation terminal 2 transmits the label image Ia and the label image Ic to the label printer 3, and the label printer 3 creates the top label LA based on the label image Ia and the bottom label LB based on the label image Ic.

<Control Procedure>

An example of the control procedure executed by the CPU 11 to implement the method described above will be described with reference to the flowchart in FIG. 9. The CPU 11 executes this control procedure based on a print label creation process program according to the present embodiment. The print label creation process program is included in the programs stored in the ROM 12b. By executing this procedure, the CPU 11 implements the following print label creation method according to the present embodiment.

Figure 9:
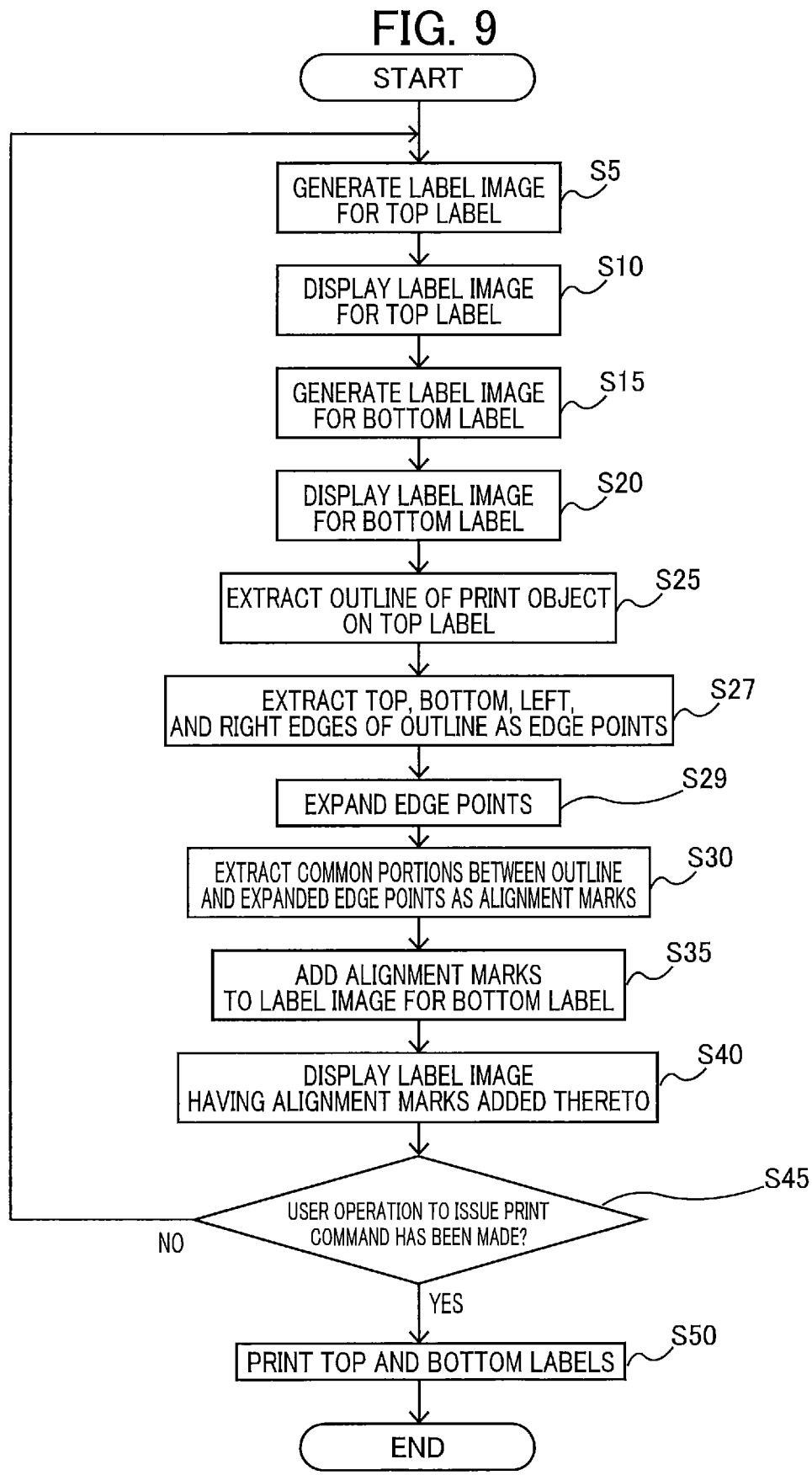
FIG. 9 is a flowchart illustrating a control procedure executed by a CPU of the operation terminal according to the embodiment.

In S5 at the beginning of the process in FIG. 9, the CPU 11 receives editing operations via the operating unit 13 suitable for creating the top label LA and generates the label image Ia for the top label LA. This label image Ia includes the mark images m1 described above for forming the circular marks M1 on the top label LA. That is, in S5 the CPU 11 generates label image data for creating the top label LA and this label image data includes mark image data representing the circular marks M1. Thereafter, in S10 the CPU 11 displays the label image Ia generated in S5 on the display unit 14.

In S15 the CPU 11 receives editing operations via the operating unit 13 suitable for creating the bottom label LB and generates the label image Ib for the bottom label LB. This label image Ib includes the text image t1 described above for forming the text T1 on the bottom label LB. That is, in S15 the CPU 11 generates label image data for creating the bottom label LB and this label image data includes text image data representing the text T1. Then, in S20 the CPU 11 displays the label image Ib generated in S15 on the display unit 14.

In S25 the CPU 11 extracts the outline images c1 described above from the mark images m1 in the label image Ia generated in S5. That is, in S25 the CPU 11 generates outline image data representing the outlines of the circular marks M1 on the basis of the mark images m1. In S27 the CPU 11 extracts the top, bottom, left, and right edges of each outline image c1 extracted in S25 as the edge points e1. In S29 the CPU 11 performs a process to expand each of the extracted edge points e1 suitably to form the expanded edge points f1.

In S30 the CPU 11 extracts the common portions between the expanded edge points f1 and outline images c1 as the part images p1 constituting the alignment mark images a1. Further, in 30 the CPU 11 generates the mark images a2 corresponding to the alignment mark images a1 and representing the alignment marks P. That is, in the process of S27 to S30, the CPU 11 generates the mark images a2 (i.e., the mark image data) representing the alignment marks P on the basis of the outline images c1. In S35 the CPU 11 generates the label image Ic by adding the mark images a2 to the label image Ib generated in S15 at positions corresponding to the outline images c1. That is, in S35 the CPU 11 generates the label image Ic by adding the mark images a2 generated in S30 to the label image Ib generated in S15 such that the alignment marks P are added to portions of the bottom label LB that correspond to the outlines of the circular marks M1 in the top label LA. In S40 the CPU 11 displays the label image Ic on the display unit 14.

In S45 the CPU 11 determines whether a print command for transmitting the label image Ia and label image Ic to the label printer 3 has been issued by the user through a prescribed operation on the operating unit 13. If a print command has not been issued (S45: NO), the CPU 11 returns to S5.

However, if a print command has been issued (S45: YES), in S50 the CPU 11 transmits the label image Ia and label image Ic to the label printer 3. As a result, the top label LA and bottom label LB are generated on the label printer 3. Subsequently, the CPU 11 ends the process of FIG. 9.

In the present embodiment described above, the top label LA includes the circular marks M1. In S25 the CPU 11 first extracts the outline images c1 from the mark images m1 in the label image Ia corresponding to the circular marks M1. Subsequently, in S27 the CPU 11 uses parts further extracted from the extracted outline images c1 to generate alignment mark images a1 for aligning the top label LA with the bottom label LB when overlaying the top label LA on the bottom label LB. In S35 the CPU 11 generates the label image Ic by adding mark images a2 to the label image Ib for the bottom label LB at positions corresponding to the outline images c1. In S45 the CPU 11 transmits this label image Ic together with the label image Ia to the label printer 3. Through this process, the label printer 3 creates the top label LA based on the label image Ia transmitted from the operation terminal 2 and creates the bottom label LB based on the label image Ic transmitted from the operation terminal 2.

Thus, the alignment marks P described above extracted from portions of the outlines of the circular marks M1 on the top label LA are formed on the bottom label LB. As a result, the user can easily align the top label LA with the bottom label LB using the alignment marks P formed on the bottom label LB as alignment marks. That is, the user places the top label LA over the bottom label LB while aligning the circular marks M1 on the top label LA with the alignment marks P formed on the bottom label LB.

In this way, the present embodiment can automatically and reliably create the alignment marks P by extracting outlines from the circular marks M1 and further extracting portions of these outlines, as described above.

A particular feature of the embodiment is that the alignment mark images a1 forming the base for the alignment marks P are generated by extracting dashed outlines (i.e., outlines described by a dashed line) from the outline images c1 corresponding to the outlines of the circular marks M1, as described above. By this method, the wasteful formation of images that exceed the minimum surface area necessary for alignment can be avoided on the bottom label LB.

The alignment mark images a1 extracted from the outline images c1 may be generated by extracting dotted outlines (outlines described by a dotted line) from the outline images c1 rather than the dashed outlines described above. Alternatively, rather than producing fragments of the solid outline images c1, such as the dashed outlines or dotted outlines, the CPU 11 may reduce the density or the thickness of the solid lines forming the outline images c1. That is, in place of the dashed outline of the circular mark M1 in the above-described embodiment, a dotted outline of the circular mark M1, a thin solid outline of the circular mark M1, or a lighter color solid line of the circular mark M1 may be employed as the alignment mark P. All these variations will obtain the same effects described in the embodiment. This method of the present embodiment is particularly effective for cases in which, in the label image Ib, text or icons having the same color as the mark images a2 are not present in areas where the mark images a2 are to added, or cases in which text or icons having part overlapping with regions where the mark images a2 are to added are not present in the label image Ib.

While the specific embodiment of the present disclosure has been described in detail, it would be apparent to those skilled in the art that many modifications and variations may be made therein. Below, some of these variations will be described in detail, wherein like parts and components are designated with the same reference numerals to avoid duplicating description.

(1) First and Second Variation: Blank Image Printing to Avoid Obscuring Marks

When print objects having part overlapping with regions of the label image Ib corresponding to the outline images c1 in the label image Ia (i.e., regions of the label image Ib where the alignment marks are to added) are present in the bottom label LB, such as when the background of alignment marks created on the bottom label LB is formed in a dark color such as black, the alignment marks may be visually obscured and difficult to see in normal printing. This variation, i.e., a first variation provides examples for handling such situations. Specifically, two sample methods, i.e., two variations of the above-described embodiment are described below.

(1-1) First Variation in which Marks are Formed of Blank Images

One method for generating the alignment marks P according to a first variation will be described with reference to FIGS. 10A-11C.

<Data Processing for the Top Label>

FIG. 10A shows the same label image Ia in FIG. 7A that includes the tape image to and the mark images m1 for the top label LA. In this process, alignment mark images a1 shown in FIG. 10B are generated from the label image Ia according to the same method described in the above-described embodiment with reference to FIGS. 7A-7E.

<Data Processing for the Bottom Label>

Figure 11A:
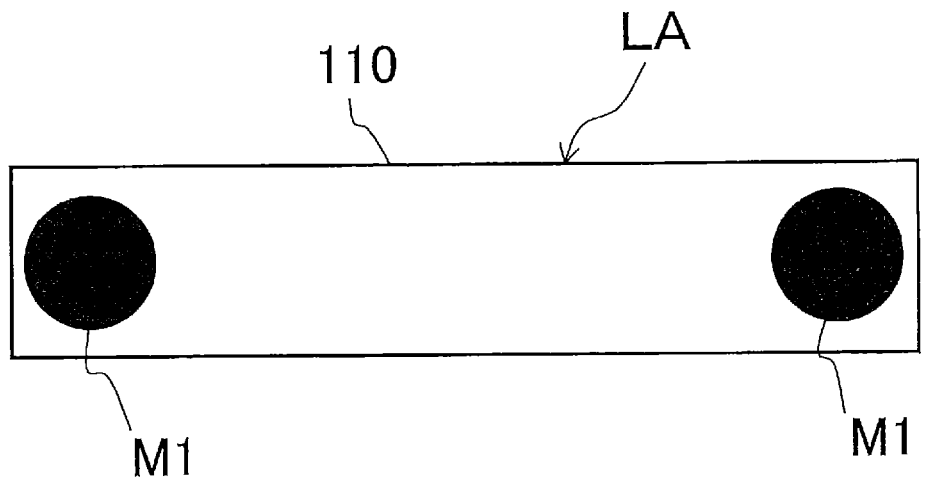
FIG. 11A is a plan view of the appearance of the top label in the first variation.
Figure 11B:
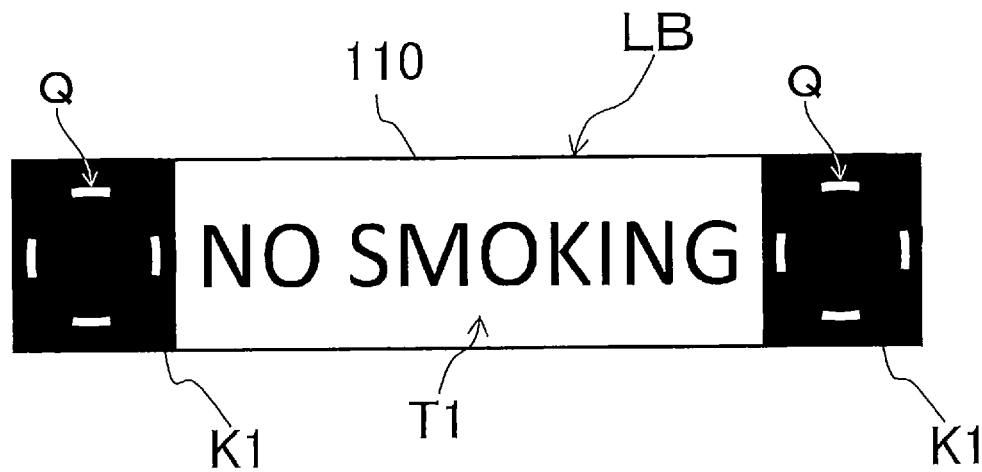
FIG. 11B is a plan view of the appearance of the bottom label in the first variation.
Figure 11C:
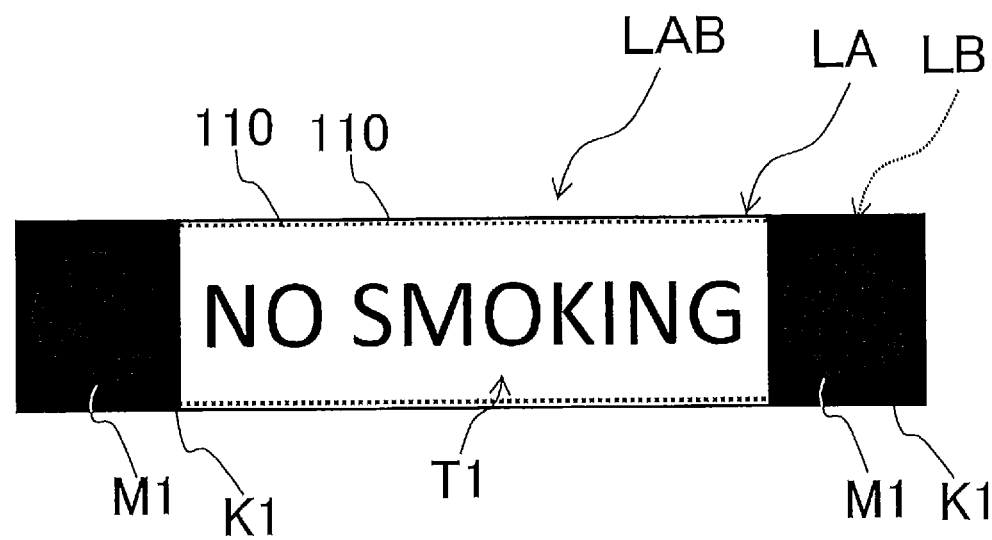
FIG. 11C is a plan view of the appearance of a composite label created by overlaying and bonding the top and bottom labels to each other in the first variation.

In the meantime, the bottom label LB in this example is designed with solid black areas on both longitudinal ends of the label, as shown in FIG. 11B and the like described later. Specifically, FIG. 10C, which corresponds to FIG. 8A in the present embodiment, shows the label image Ib generated for the bottom label LB through user editing operations on the operation terminal 2. In addition to the tape image tb and the text image t1 identical to those in FIG. 8A, the label image Ib is provided with black-filled images k1 (i.e., black-filled image data) on both longitudinal ends. That is, the black-filled images k1 represent print objects having part overlapping with regions of the label image Ib corresponding to the outline images c1 in the label image Ia described in the above-described embodiment. Further, the print objects have the same black color as the alignment mark images a1 described above and are present in the regions of the label image Ib corresponding to the outline images c1 in the label image Ia.

In the first variation, mark images b1 corresponding to the alignment mark images a1 described above are added to the label image Ib in positions corresponding to the outline images c1 of the label image Ia described above, as illustrated in FIG. 10D. Note that each of the mark images b1 is constituted by four part images q1 corresponding to the four part images p1 described above. Here, in this variation, the black-filled images k1 constitute the print objects having part overlapping with the regions of the label image Ib corresponding to the outline images c1 in the label image Ia. In this example, the black-filled images K1 further constitute the background of the mark images b1. Therefore, the label image Ic is generated by adding the mark images b1 in form of blank images, that is, the label image Ic is generated such that alignment marks Q represented by the mark images b1 are formed of blank images by not performing printing (image formation) of the overlapped parts of the print objects represented by the black-filled images k1. The method in this variation is implemented by the CPU 11 executing the flowchart in FIG. 9 described in the present embodiment. The generation of this label image Ic is performed in S35.

Thus, in S50 of FIG. 9 executed after step S35, the label printer 3 creates the top label LA shown in FIG. 11A and the bottom label LB shown in FIG. 11B. That is, on the bottom label LB, the alignment marks Q corresponding to the mark images b1 are formed of blank images within black-filled regions K1 corresponding to the black-filled images k1 described above. Thus, as in the present embodiment, the user can create the composite label LAB shown in FIG. 11C by overlaying and bonding the top label LA to the bottom label LB while aligning the outer edges of the circular marks M1 with the alignment marks Q. Note that the alignment marks Q are formed of blank images that are not printed and, hence, the color of the alignment marks Q is dependent on the color of the print label tape 110 constituting the bottom label LB, which may not be white.

<Effects of the First Variation>

To generate the label image Ic in the first variation described above, mark images b1 are formed of blank images since they are to be arranged in positions overlapping the black-filled images k1, which correspond to existing print objects. Accordingly, the resulting alignment marks Q are prevented from becoming visually obscured and difficult to see when overlapped by the black-filled regions K1 corresponding to these black-filled images k1.

Note that the alignment marks Q are not limited to being formed as blank image marks described in the first variation. That is, provided that the color of the alignment marks Q is sufficiently lighter than the black-filled regions K1 to prevent the alignment marks Q from being buried in contrast to the black-filled regions K1, the same effects can be obtained.

(1-2) Second Variation in which Blank Image Regions are Formed Around the Marks

While the above variation prevents alignment marks from becoming visually obscured by forming the marks themselves as blank image marks, the marks may be prevented from becoming obscured by leaving the marks in black but forming their peripheral regions as blank image regions. One such method according to a second variation will be described next with reference to FIGS. 12A and 13C.

Figure 12A:
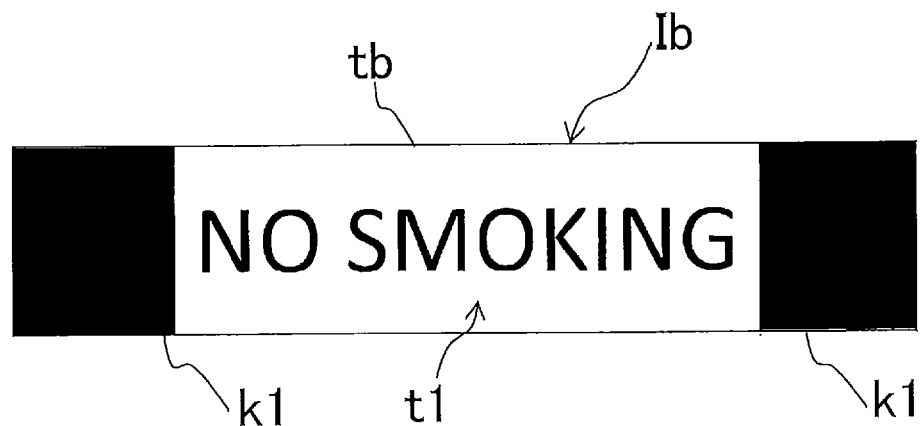
FIGS. 12A and 12B are explanatory views illustrating an example of adding, to a label image for a bottom label, mark images corresponding to alignment mark images extracted from a label image for a top label in a second variation of the embodiment in which peripheral regions of alignment marks are formed of blank images.
Figure 12B:
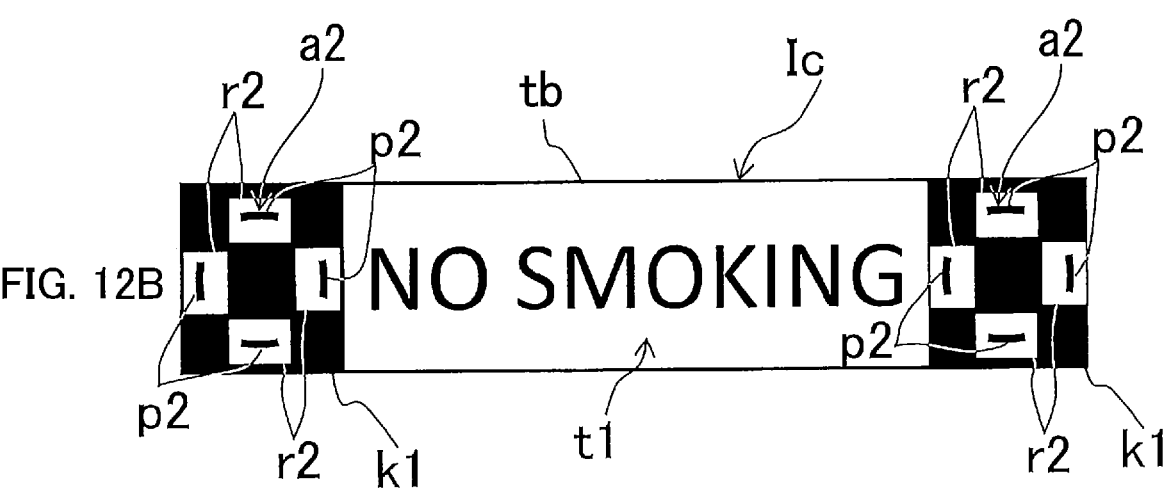

FIG. 12A shows the same label image Ib generated for the bottom label LB through user editing operations on the operation terminal 2. The label image Ib is provided with the tape image tb, the text image t1, and the black-filled images k1 as in the label image Ib shown in FIG. 10C. In the second variation, the mark images a2 corresponding to the alignment mark images a1 described above are added to the label image Ib at locations corresponding to the outline images c1 in the label image Ia described above, as shown in FIG. 12B.

However, the black-filled images k1 form print objects having part overlapping with the regions of the label image Ib corresponding to the outline images c1 in the label image Ia and further form the background for the mark images a2. In other words, as in the label image Ib described above, the black-filled images k1 represent print objects in the same black color as the alignment mark images a1 described above and are present at locations corresponding to the outline images c1 in the label image Ia. If printed as is, the printed alignment marks corresponding to the mark images a2 would become buried in the printed images corresponding to the black-filled images k1 and be difficult to see. Hence, in the second variation, the label image Ic is generated by adding blank images r2 representing blank image regions around each of the part images p2 constituting the mark images a2. That is, in the second variation, the label image Ic is generated such that peripheral regions of the alignment marks P are formed of blank images by not performing image formation of peripheral regions of the overlapped parts of the print objects represented by the black-filled images k1. This method of the present variation is implemented by the CPU 11 executing the flowchart in FIG. 9, as described in the present embodiment, and the label image Ic described above is generated in S35.

Consequently, in S50 of FIG. 9 executed after step S35 described above, the label printer 3 creates the top label LA shown in FIG. 13A and the bottom label LB shown in FIG. 13B. That is, on the bottom label LB, blank image regions R corresponding to the blank images r2 described above are formed within the black-filled regions K1 corresponding to the black-filled images k1, and alignment marks P corresponding to the mark images a2 are formed respectively in these blank image regions R. Accordingly, as in the present embodiment, the user can create the composite label LAB shown in FIG. 13C by overlaying and bonding the top label LA to the bottom label LB while aligning the outer edges of the circular marks M1 with the alignment marks P.

<Effects of the Second Variation>

To generate the label image Ic described in the second variation, the blank images r2 are provided around the peripheries of the part images p2 constituting the mark images a2 since the alignment mark images a1 are arranged at positions overlapping black-filled images k1, which constitute existing print objects. Surrounding the alignment marks P with the blank image regions R in this way can prevent the alignment marks P from becoming visually buried and difficult to see when overlapped by the black-filled regions K1 corresponding to the black-filled images k1 described above.

Note that the present disclosure is not limited to forming blank image regions R around the alignment marks P as in the second variation described above. The same effects can be obtained, provided that the regions R are printed in a solid color sufficiently light to prevent the alignment marks P from becoming obscured.

(2) Third Variation: Forming Marks in a Lighter Color

In a third variation, the color of the mark images is made lighter when print objects having part overlapping with regions of the label image Ib corresponding to the outline images c1 in the label image Ia (i.e., regions of the label image Ib where the alignment marks are to added) are present in the bottom label LB, such as when print objects having the same color as the mark images are present in the label image Ib at locations corresponding to the outline images c1 in the label image Ia. One such method according to the third variation will be described with reference to FIGS. 14A-15C.

<Data Processing for the Top Label>

In the third variation, alignment mark images a1 shown in FIG. 14B are first generated based on the label image Ia shown in FIG. 14A for the top label LA according to the same method described in the present embodiment.

<Data Processing for the Bottom Label>

Figure 15A:
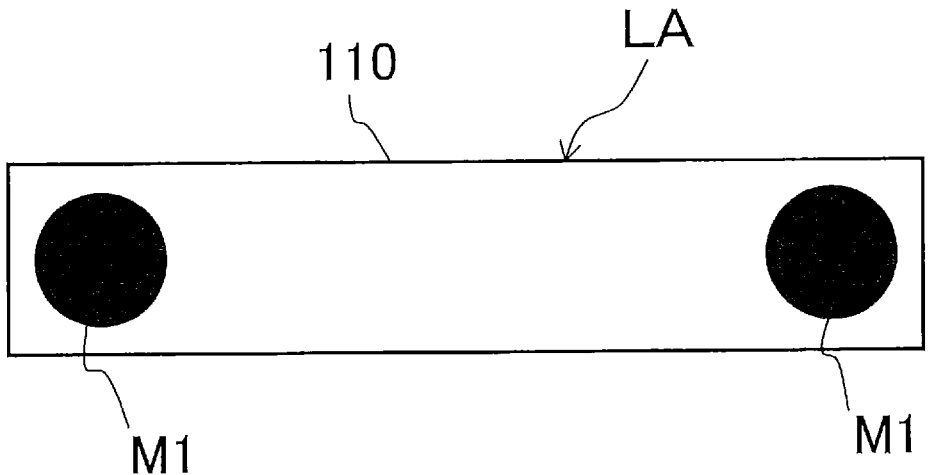
FIG. 15A is a plan view of the appearance of the top label in the third variation.
Figure 15B:
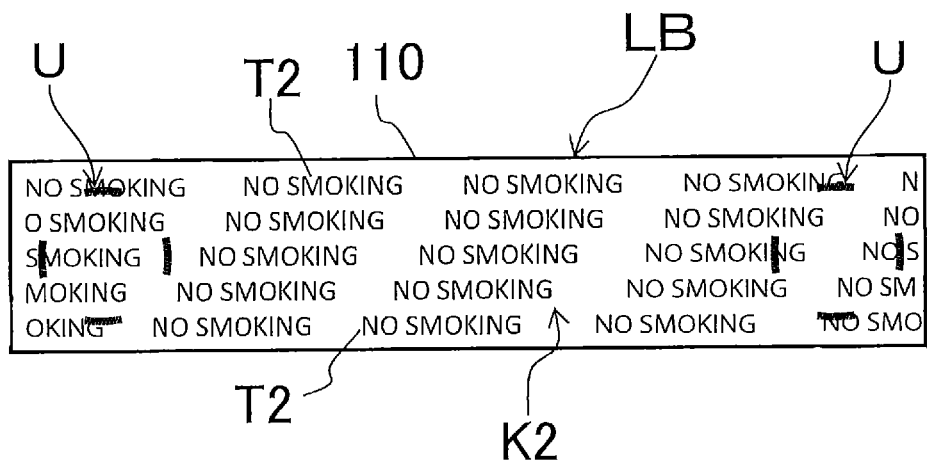
FIG. 15B is a plan view of the appearance of the bottom label in the third variation.

In the meantime, the bottom label LB in the third variation is designed with a background pattern including numerous small "NO SMOKING" texts T2 over nearly the entire bottom label LB, as shown in FIG. 15B and the like described later. Specifically, FIG. 14C, which corresponds to FIG. 8A in the above-described embodiment, shows the label image Ib generated for the bottom label LB through user editing operations on the operation terminal 2. In addition to the tape image tb identical to that in FIG. 8A, the label image Ib shown in FIG. 14C is provided with a background pattern image k2 including the numerous small "NO SMOKING" texts. In other words, the small "NO SMOKING" text images included in the background pattern image k2 are present in areas of the label image Ib corresponding to the outline images c1 in the above-described label image Ia. The small "NO SMOKING" text images represent print objects having part overlapping with regions of the label image Ib corresponding to the outline images c1 in the label image Ia, and further, these print objects have the same black color as the alignment mark images a1 described above.

In the third variation, mark images d2 corresponding to the alignment mark images a1 described above are added to the label image Ib in positions corresponding to the outline images c1 of the label image Ia described above, as illustrated in FIG. 14D. Note that each of the mark images d2 is constituted by four part images u2 corresponding to the above-described four part images p1. Here, according to this variation, the label image Ic is generated by adding the mark images d2 in a lighter color than that of the "NO SMOKING" text images since the numerous small "NO SMOKING" text images are present in the background of the mark images d2 and overlapping with the same. The method in this variation is implemented by the CPU 11 executing the flowchart in FIG. 9 described in the present embodiment, and the generation of the label image Ic is performed in S35.

Thus, in S50 of FIG. 9 executed after step S35, the label printer 3 creates the top label LA shown in FIG. 15A and the bottom label LB shown in FIG. 15B. That is, a background region K2 corresponding to the background pattern image k2 and including the numerous small "NO SMOKING" texts T2 arranged over nearly the entire bottom label LB is formed on the bottom label LB, and alignment marks U corresponding to the mark images d2 are formed so as to overlap some of these "NO SMOKING" texts T2.

Figure 15C:
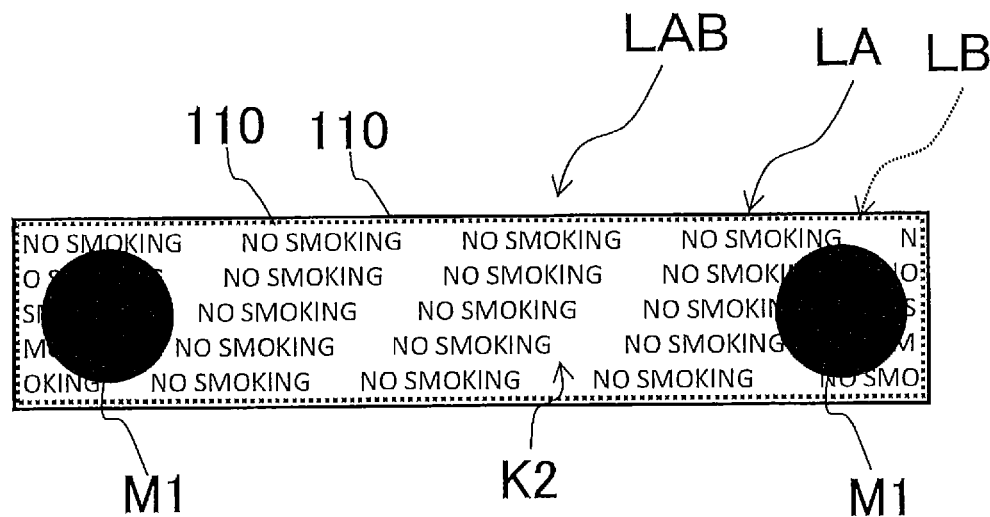
FIG. 15C is a plan view of the appearance of a composite label created by overlaying and bonding the top and bottom labels to each other in the third variation.

Accordingly, as in the above-described embodiment, the user can create the composite label LAB as shown in FIG. 15C by overlaying and bonding the top label LA to the bottom label LB while aligning the outer edges of the circular marks M1 with the alignment marks U.

As described above, the alignment marks U are formed in a lighter color than that of the "NO SMOKING" in the background region K2. Therefore, the "NO SMOKING" texts T2 forming the background can be seen through the alignment marks U in areas where the alignment marks U overlap the "NO SMOKING" texts T2.

<Effects of the Third Variation>

To generate the label image Ic in the third variation described above, the mark images d2 are formed in a light color since they are arranged in positions overlapping "NO SMOKING" text images, which constitute existing print objects. This method can prevent the alignment marks U from becoming visually obscured and difficult to see when the alignment marks U are overlapped by the "NO SMOKING" texts T2 in the background region K2.

Further, the "NO SMOKING" texts T2 in the background region K2 constituting print objects that overlap the alignment marks U in the bottom label LB are visible despite the presence of the alignment marks U in the third variation. Thus, the present variation effectively prevents the alignment marks U from degrading the appearance of the background pattern.

While the above description uses the example of text as the print objects that are overlapped by the alignment marks U, this variation can be applied to a case in which suitable icons are the print objects overlapped by the alignment marks U. In this case, the same effects can be obtained by making the alignment marks U lighter in color than the icons.

Further, the present disclosure is not limited to making the alignment marks U themselves lighter in color. As in the variation described above with reference to FIGS. 12A to 13C, regions of a fixed range may be provided around the alignment marks U, and the color of these regions may be set lighter than that of the print objects, such as text or icons. This variation can obtain the same effects described above.

(3) Fourth Variation: Reducing the Mark Size

<Appearance of Each Label>

In some cases, the user may wish to overlay a top label LA such as that shown in FIG. 16A with a bottom label LB similar to that shown in FIG. 16B. In a fourth variation of the above-described embodiment, the top label LA shown in FIG. 16A is provided with circular marks M1 identical to those in FIGS. 6A, 11A, and 15A, and the bottom label LB is provided with background pattern regions K3. In the example shown in FIG. 16B, small "NO SMOKING" texts T3 are formed repeatedly in a horizontal row along each widthwise edge of the bottom label LB. Each row of these "NO SMOKING" texts T3 constitutes a background pattern region K3. A wide space RR is formed in the widthwise center region of the bottom label LB between the two background pattern regions K3.

If the same method shown in FIGS. 7A-7E were used to create the bottom label LB, the alignment marks formed based on the alignment mark images a1 extracted according to the mark images m1 may not be fully contained within the space RR and could cover some of the "NO SMOKING" texts T3. In consideration for the appearance of the bottom label LB, the method of the fourth variation avoids forming alignment marks that overlap "NO SMOKING" texts T3 formed along the widthwise edges of the bottom label LB.

To this end, rather than forming the alignment marks P described above in FIG. 6B and the like, the method according to the fourth variation forms an alignment mark X along a circle having a smaller diameter than the circle describing the outline of each circular mark M1. In the fourth variation, for each circular mark M1, in addition to the alignment mark X, a center alignment mark Y for aligning the center of the circular mark M1 with the center of the alignment mark X is formed at the center position radially inside the alignment mark X. Thus, the user can create the composite label LAB shown in FIG. 16C by overlaying and bonding the top label LA to the bottom label LB while roughly aligning the center positions of the circular marks M1 with the center alignment marks Y on the bottom label LB.

<Description of the Data Processing Method>

Next, data processing for implementing the above method according to the fourth variation will be described.

<Data Processing for the Top Label>

Figure 17A:
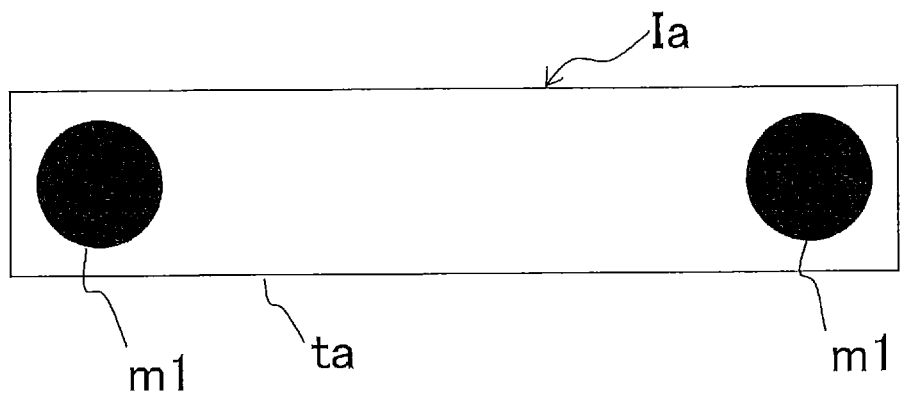
FIGS. 17A to 17C are explanatory views illustrating an example of a procedure for reducing the overall outer dimensions of alignment mark images in the fourth variation, wherein the alignment mark images are extracted from a label image for the top label and then the overall outer dimensions of the alignment mark images are reduced.
Figure 17B:
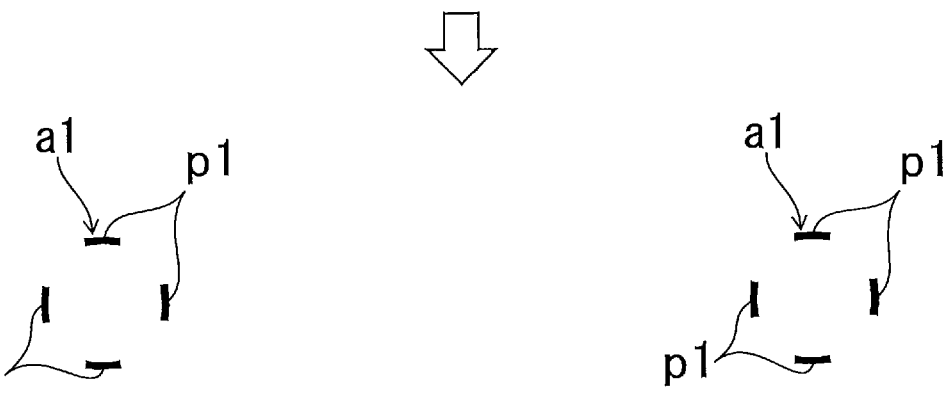

First, alignment mark images a1 shown in FIG. 17B are generated based on the label image Ia shown in FIG. 17A for the top label LA according to the same method described above.

Figure 17C:

In the present variation, as illustrated in FIG. 17C, an alignment mark images a1' constituted by four part images p1' are formed for each alignment mark image a1 by moving each of the four part images p1 radially inward. In this way, the overall outer dimension of the four part images p1' is reduce so as to be smaller than the overall outer dimension of the four original part images p1. Here, in order for the four part images p1' to together form an overall circular shape, the radius of curvature of each arc-shaped part image p1' is smaller than that of the arc-shaped part image p1.

In the above description, the alignment mark images a1 are generated from the outline images c1 extracted from the mark images m1, and the alignment mark images a1' are generated based on these alignment mark images a1. However, the method of generating the alignment mark images a1' is not limited to that in the fourth variation described above. For example, the outline images c1 shown in FIG. 18A may be reduced in size to form outline images c1' shown in FIG. 18B, and the alignment mark images a1' may subsequently be generated from the outline images c1', as shown in FIG. 18C. This modification of the fourth variation can obtain the same effects described above.

<Data Processing for the Bottom Label>

Figure 19A:
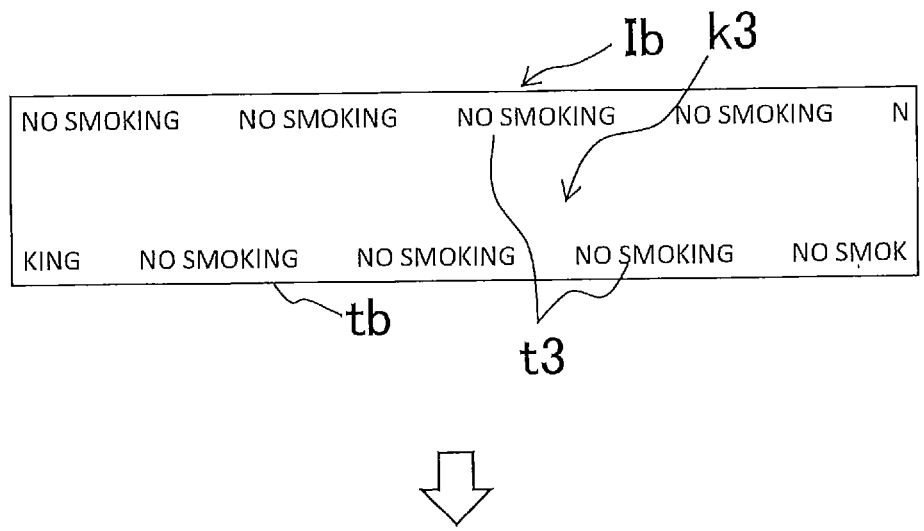
FIGS. 19A and 19B are explanatory views illustrating an example of adding, to a label image for the bottom label, mark images corresponding to the reduced alignment mark images in the fourth variation.

In the meantime, the label image Ib for the bottom label LB is generated as shown in FIG. 19A by the user performing suitable editing on the operation terminal 2 for content to be printed on the bottom label LB. As in the example described above, the label image Ib includes the tape image tb representing the appearance of the print label tape 110 forming the bottom label LB. Further, a background pattern image k3 corresponding to the background pattern regions K3 is arranged in the tape image tb. The background pattern image k3 includes text images t3 corresponding to the "NO SMOKING" texts T3.

Figure 19B:
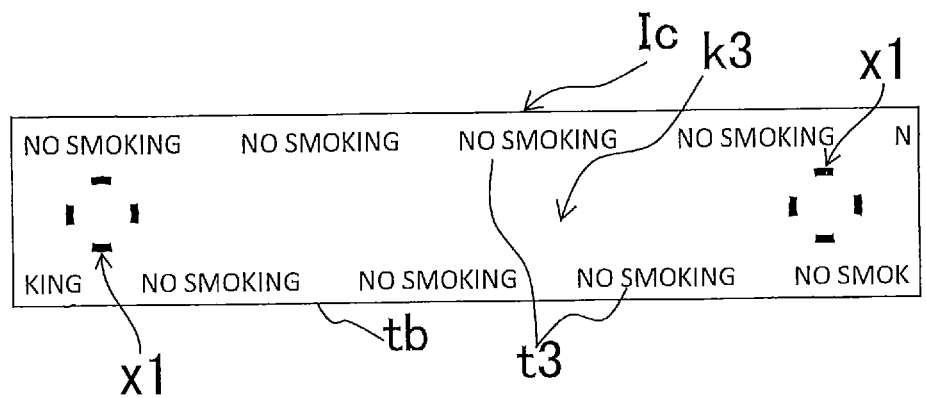

Next, a label image Ic shown in FIG. 19B is generated by adding mark images x1 corresponding to the alignment mark images a1' described above to the label image Ib shown in FIG. 19A at locations corresponding to the outline images c1 in the label image Ia described above.

Thereafter, the operation terminal 2 transmits the label image Ia and the label image Ic to the label printer 3, as in the above example, and the label printer 3 creates the top label LA based on the label image Ia and the bottom label LB based on the label image Ic.

<Effects of the Fourth Variation>

According to the fourth variation, when background pattern regions K3 are present within a certain range of the bottom label LB (on both widthwise edges of the bottom label LB in the above example), the overall outer dimension of the alignment mark X is reduced in size so that the alignment mark X formed on the bottom label LB do not cover the background pattern regions K3.

In the present variation, the alignment marks X are formed on the bottom label LB with a reduced overall outer shape, and specifically so as to be compressed toward the widthwise center of the bottom label LB. Thus, even if the top label LA deviates slightly from its intended position on the bottom label LB when the user bonds the labels together, causing a widthwise edge portion of the bottom label LB to be exposed outside the widthwise edge portion of the top label LA, this method prevents the alignment marks X from protruding outside the circular marks M1, thereby effectively preventing degradation in the appearance of the composite label LAB.

(4) Other Variations

The present embodiment describes a laminating method in which printing is performed on the cover film 104 separate from the base tape 102, and the cover film 104 and base tape 102 are bonded together. However, the present disclosure may be applied to a method of printing on a print tape layer provided in the base tape (a non-laminating type).

Further, the flowchart shown in FIG. 9 do not limit the present disclosure to the steps indicated therein. Steps may be added or deleted, or their order may be rearranged, without departing from the spirit and technical ideas of the disclosure.

In addition to what has already been described, the methods according to the embodiment and its variations described above may be used in suitable combinations.

In addition, although not illustrated individually, the present disclosure may be implemented with various modifications.

What is claimed is:

1. A non-transitory computer-readable storage medium storing a set of computer-readable instructions for a terminal device, the terminal device including a processor and a communication interface enabling the terminal device to communicate with a label creating device configured to create print labels, the set of computer-readable instructions, when executed by the processor, causing the terminal device to perform:

(a) generating first print data for creating a first print label on which a first print object is formed, the first print data including first print object data representing the first print object;

(b) generating second print data for creating a second print label on which a second print object is formed, the second print data including second print object data representing the second print object;

(c) generating, on the basis of the first print object data included in the first print data generated in (a), outline data representing an outline of the first print object;

(d) generating, on the basis of the outline data generated in (c), alignment mark data representing an alignment mark, the alignment mark being used for aligning the first print label with the second print label when overlaying the first print label and the second print label on each other;

(e) generating third print data by adding the alignment mark data generated in (d) to the second print data generated in (b) such that the alignment mark is added to a specific portion of the second print label, the specific portion being a portion corresponding to the outline of the first print object in the first print label; and (f) transmitting the first print data generated in (a) and the third print data generated in (e) to the label creating device through the communication interface.

2. The non-transitory computer-readable storage medium according to claim 1, wherein the alignment mark represented by the alignment mark data generated in (d) is one of:

a dashed outline of the first print object that is the outline of the first print object described by a dashed line;

a dotted outline of the first print object that is the outline of the first print object described by a dotted line; and a thin outline of the first print object that is the outline of the first print object described by a thin line.

3. The non-transitory computer-readable storage medium according to claim 1, wherein, in a case where the second print data generated in (b) indicates that a specific print object having part overlapping with the specific portion is present in the second print label, the third print data is generated in (e) such that the color of the alignment mark or the color of a peripheral region of the alignment mark is lighter than that of the specific print object.

4. The non-transitory computer-readable storage medium according to claim 1,
wherein, in a case where the second print data generated in (b) indicates that a specific print object having part overlapping with the specific portion is present in the second print label, the third print data is generated in (e) such that the alignment mark is formed of a blank image by not performing image formation of the part overlapping with the specific portion or such that a peripheral region of the alignment mark is formed of a blank image by not performing image formation of a peripheral region of the part overlapping with the specific portion.

5. The non-transitory computer-readable storage medium according to claim 1,
wherein, in a case where the second print data generated in (b) indicates that a specific print object having part overlapping with the specific portion is present in the second print label, the third print data is generated in (e) such that the alignment mark is formed of a blank image by not performing image formation of the part overlapping with the specific portion or such that a peripheral region of the alignment mark is formed of a blank image by not performing image formation of a peripheral region of the part overlapping with the specific portion, and
wherein, in a case where the second print data generated in (b) indicates that the specific print object is not present in the second print label, the alignment mark is printed at the specific portion.

6. The non-transitory computer-readable storage medium according to claim 1,
wherein the alignment mark data is generated in (d) so as to represent part of a small version of the outline of the first print object, the small version being obtained by reducing the outline of the first print object.

7. The non-transitory computer-readable storage medium according to claim 1,
wherein the alignment mark data is generated in (d) so as to represent a small version of part of the outline of the first print object, the small version being obtained by reducing the overall outer dimension of the part of the outline of the first print object.

8. A control device comprising:
a communication interface enabling the control device to communicate with a label creating device configured to create print labels; and
a controller configured to perform:
(a) generating first print data for creating a first print label on which a first print object is formed, the first print data including first print object data representing the first print object;
(b) generating second print data for creating a second print label on which a second print object is Ruined, the second print data including second print object data representing the second print object;
(c) generating, on the basis of the first print object data included in the first print data generated in (a), outline data representing an outline of the first print object;
(d) generating, on the basis of the outline data generated in (c), alignment mark data representing an alignment mark, the alignment mark being used for aligning the first print label with the second print label when overlaying the first print label and the second print label on each other;
(e) generating third print data by adding the alignment mark data generated in (d) to the second print data generated in (b) such that the alignment mark is added to a specific portion of the second print label, the specific portion being a portion corresponding to the outline of the first print object in the first print label; and
(f) transmitting the first print data generated in (a) and the third print data generated in (e) to the label creating device through the communication interface.

9. A print label creation method comprising:
(a) generating first print data for creating a first print label on which a first print object is formed, the first print data including first print object data representing the first print object;
(b) generating second print data for creating a second print label on which a second print object is formed, the second print data including second print object data representing the second print object;
(c) generating, on the basis of the first print object data included in the first print data generated in (a), outline data representing an outline of the first print object;
(d) generating, on the basis of the outline data generated in (c), alignment mark data representing an alignment mark, the alignment mark being used for aligning the first print label with the second print label when overlaying the first print label and the second print label on each other;
(e) generating third print data by adding the alignment mark data generated in (d) to the second print data generated in (b) such that the alignment mark is added to a specific portion of the second print label, the specific portion being a portion corresponding to the outline of the first print object in the first print label; and
(f) creating the first print label corresponding to the first print data generated in (a) and the second print label corresponding to the third print data generated in (e).

* * * * *